United States Patent [19]

Ogawa et al.

[11] Patent Number: 5,042,927
[45] Date of Patent: Aug. 27, 1991

[54] COMPACT ZOOM LENS

[75] Inventors: Hideki Ogawa, Tokyo; Hiroshi Endo, Kanagawa, both of Japan

[73] Assignee: Canon Kabushiki Kaisha, Tokyo, Japan

[21] Appl. No.: 449,710

[22] Filed: Dec. 12, 1989

[30] Foreign Application Priority Data

Dec. 21, 1988 [JP] Japan .................................. 63-323045
Dec. 22, 1988 [JP] Japan .................................. 63-324388
Dec. 22, 1988 [JP] Japan .................................. 63-324389

[51] Int. Cl.$^5$ .............................................. G02B 15/14
[52] U.S. Cl. ...................................... 359/683; 359/676
[58] Field of Search ................................. 350/423, 427

[56] References Cited

U.S. PATENT DOCUMENTS 4,861,145 8/1989 Kikuchi .................................. 350/427
4,871,243 10/1989 Ogawa et al. ........................ 350/463

FOREIGN PATENT DOCUMENTS 60-175020 9/1985 Japan .
63-189819 8/1988 Japan .

Primary Examiner—Bruce Y. Arnold
Assistant Examiner—Rebecca D. Gass
Attorney, Agent, or Firm—Fitzpatrick, Cella, Harper & Scinto

[57] ABSTRACT

A zoom lens is disclosed comprising, from front to rear, a first lens group of positive power, a second lens group of negative power, a third lens group of positive power, a fourth lens group of positive power, and a fifth lens group of negative power, at least a predetermined plurality of lens groups of the first to fifth lens groups being made to move in such a manner that when zooming from the wide-angle end to the telephoto end, the first lens group is moved forward, while simultaneously monotonously increasing the air separation between the first and second lens groups and monotonously decreasing the air separations between the second and third lens groups and between the fourth and fifth lens groups, and the zoom lens satisfying the following conditions: $0.05 \; fT/fW < \Delta e34/DW < 0.15 \; fT/fW$ $0.05 < f5/f12W < 0.6$ where fW and fT are the shortest and longest focal lengths of the entire lens system, f5 is the focal length of the fifth lens group, f12W is the overall focal length of the first and second lens groups at the wide-angle end, $\Delta e34$ is a changed amount of the principle point interval between the third and fourth lens groups at the telephoto end from that at the wide-angle end and DW is the length of the entire lens system from the first lens surface to the last lens surface.

9 Claims, 21 Drawing Sheets

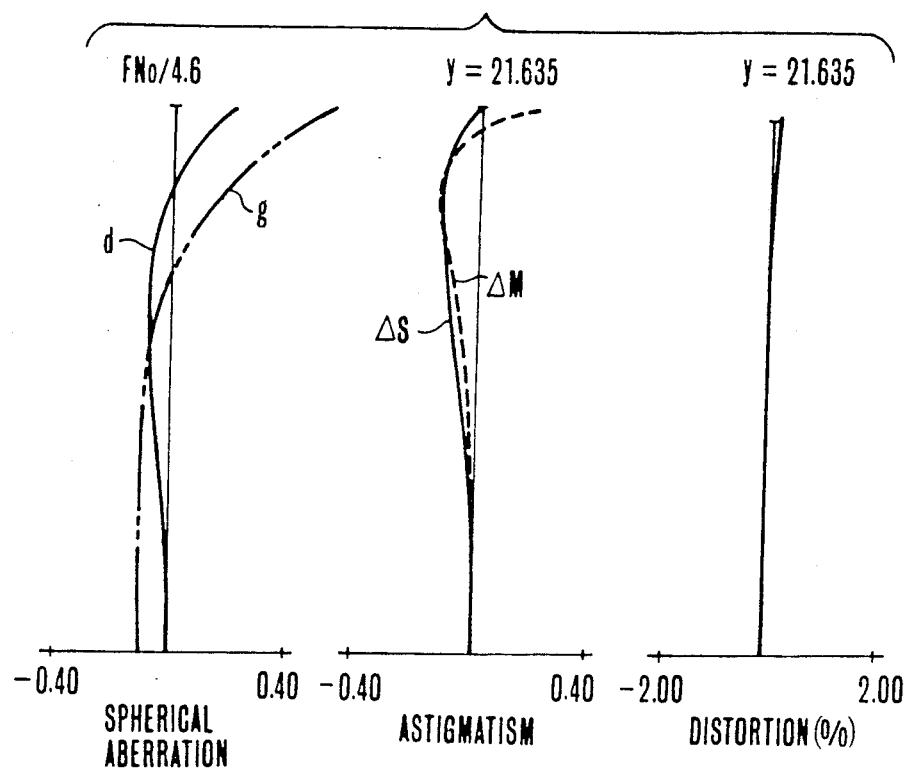
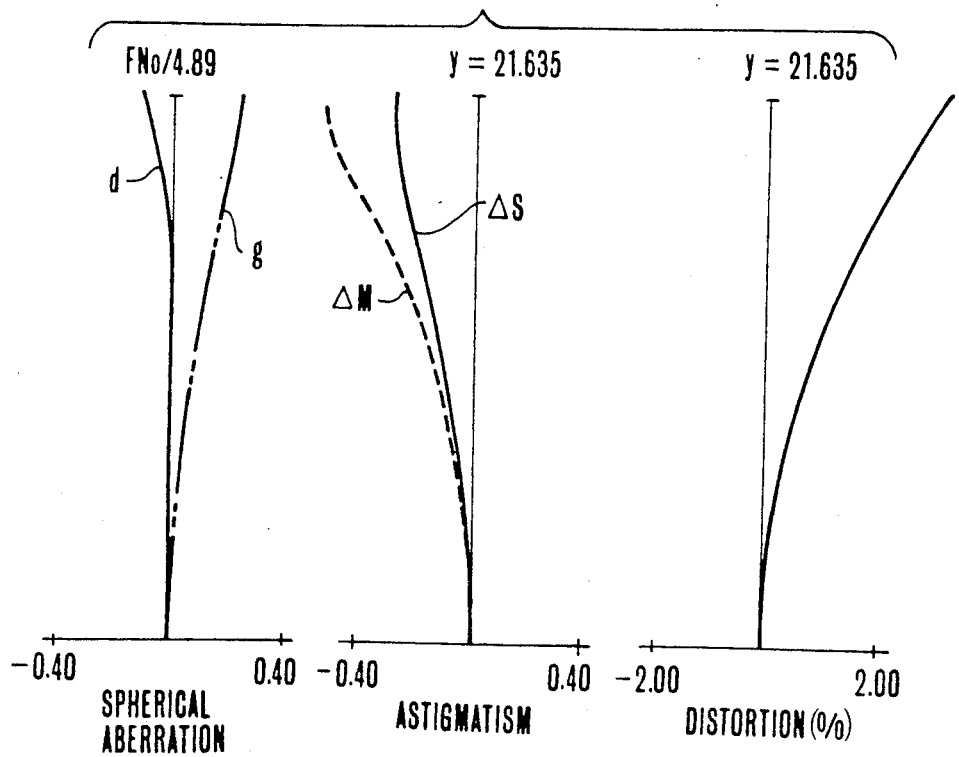

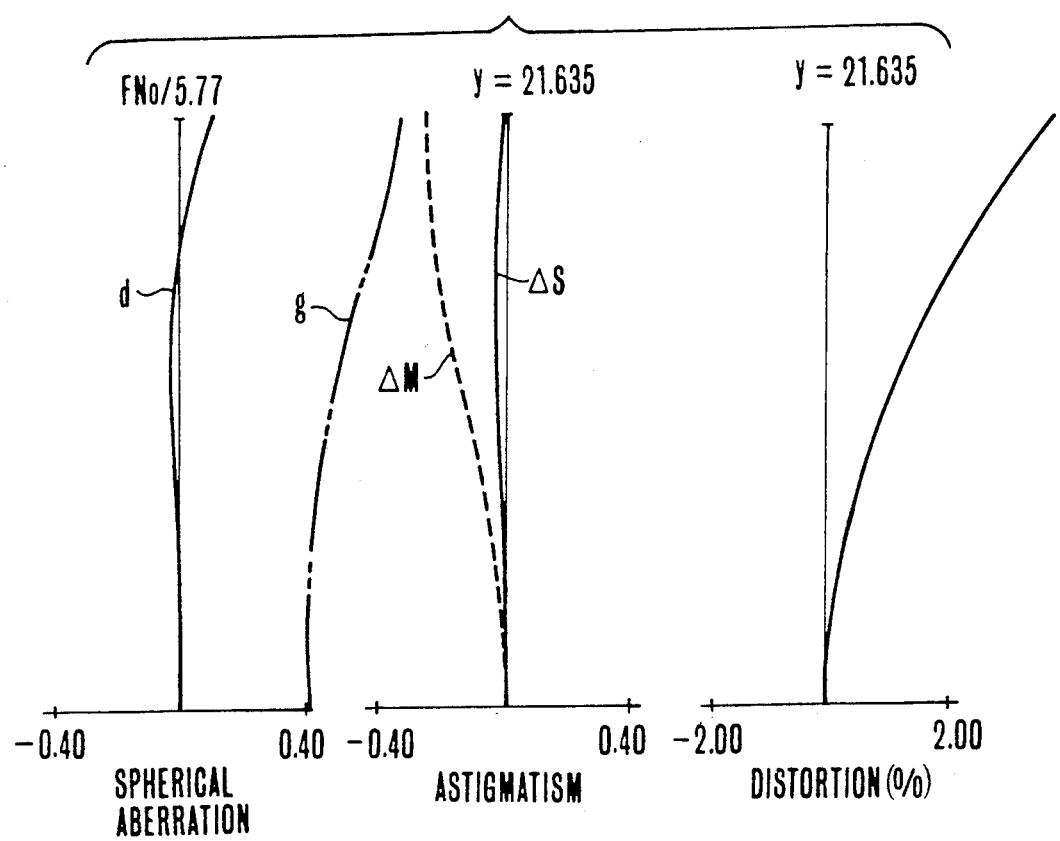

COMPACT ZOOM LENS

BACKGROUND OF THE INVENTION

1. Field of the Invention

This invention relates to compact zoom lenses of the telephoto type including long focal lengths suited to 35 m/m cameras, video cameras and electronic still cameras and, more particularly, to compact zoom lenses having five lens groups, a plurality of lenses of which are made to move to vary the image magnification, so that the optical performance is kept high over the entire range of magnification of about 2.5.

2. Description of the Related Art

There are many previous proposals for a zoom lens having five or more lens groups, of which at least three lens groups are made to move for zooming purposes in order to achieve a minimization of the entire lens system while securing the predetermined zoom ratio.

Of these, ones which are comprised entirely of five lens groups and have three or more of their lens groups made to move when varying the image magnification are proposed, for example, in Japanese Laid-Open Patent Application No. Sho 60-175020 and Japanese Laid-Open Patent Application No. Sho 63-189819.

The Japanese Laid-Open Patent Application No. Sho 60-1755020 is proposing zoom lenses of the telephoto type including relatively long focal lengths. In this document, either all of the five lens groups having predetermined refractive powers are made to move, or four of them, say, the first, third, fourth and fifth lens groups, are made to move toward, for example, the object side, when the image magnification is varied from the wide-angle end to the telephoto end, thereby providing a range of 3 and a minimum F-number in about 3.6 to 5.6.

Another document or the Japanese Laid-Open Patent Application No. Sho 63-189819 is proposing zoom lenses of the standard form including relatively wide angles of view, when zooming from the wide-angle end to the telephoto end, of the five lens groups having predetermined refractive powers, the first lens group is made to move toward the object side, while the third, fourth and fifth lens groups are made to move in either fixedly or variably spaced relation, as a whole, toward the object side.

In such a way, the zoom lens may entirely be constructed from five lens groups so that a plurality of not less than three of these lens groups can be arranged to move, while maintaining predetermined relations to each other, in order to vary the image magnification. Because this zoom type facilitates a minimization of the size of the entirety of the lens system while securing the zoom ratio at a certain value, it has found its use in the zoom lenses of 35 m/m cameras, video cameras, etc..

With such a zoom type in use, when achieving a further minimization of the bulk and size of the whole lens system by shortening its total length, it is usual to take either of the measures that the number of lens members in each group is reduced, and that the refractive power of each lens group is strengthened.

Relying merely on either or both of the reduction of the number of lens members and the increase of the refractive power of each lens group, however, leads to an insufficiency of aberration correction in each lens group and also an increase of the range of variation of aberrations with variation of the image magnification, thus giving a problem that it becomes very difficult to obtain high grade imagery over the entire range of variation of the image magnification.

SUMMARY OF THE INVENTION

An object of the invention is to provide a compact zoom lens as constructed entirely from five lens groups having predetermined refractive powers, wherein proper ranges for the refractive powers of all the lens groups and proper conditions for the movements of all the zooming lens groups are set forth to achieve a much desired shortening of the total length of the entire system in such a manner that a high optical performance is maintained throughout the entire range of variation of magnification.

To accomplish such an object, according to the invention, the zoom lens has, in the order from the front, a first lens group of positive refractive power, a second lens group of negative refractive power, a third lens group of positive refractive power, a fourth lens group of positive refractive power and a fifth lens group of negative refractive power, at least a predetermined plurality of lens groups of the first, second, third, fourth and fifth lens groups being made to move in such a manner that when zooming from the wide angle-end to the telephoto end, the first lens group is moved forward, while simultaneously the air separation between the first lens group and the second lens group monotonously increases, the air separation between the second lens group and the third lens group monotonously decreases, and the air separation between the fourth lens group and the fifth lens group monotonously decreases. And, the invention has set forth inequalities of conditions to be described later.

BRIEF DESCRIPTION OF THE DRAWINGS

FIGS. 9(A) to 9(C), 10(A) to 10(C), 11(A) to 11(C), 12(A) to 12(C), 13(A) to 13(C), 14(A) to 14(C), 15(A) to 15(C) and 16(A) to 16(C) are graphic representations of the various aberrations of the zoom lenses of FIGS. 1 to 8 respectively. In these graphs, FIGS. 9(A), 10(A), 11(A), 12(A), 13(A), 14(A), 15(A) and 16(A) show the aberrations in the wide-angle end, FIGS. 9(B), 10(B), 11(B), 12(B), 13(B), 14(B), 15(B) and 16(B) in an intermediate position, and FIGS. 9(C), 10(C), 11(C), 12(C), 13(C), 14(C), 15(C) and 16(C) in the telephoto end.

Figure 1:
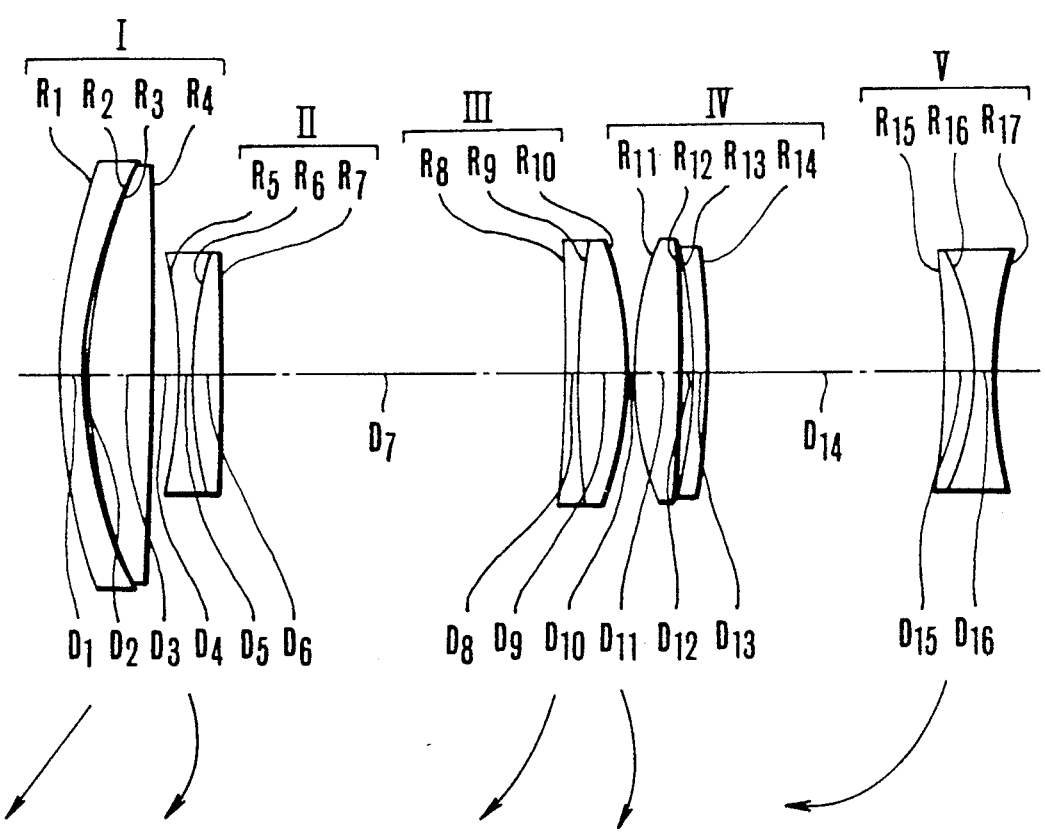
FIG. 1 to FIG. 8 are longitudinal section views of examples 1 to 8 of specific zoom lenses of the invention respectively.

In these drawings, I, II, III, IV and V denote consecutively the first, second, third, fourth and fifth lens groups; $\Delta S$ denotes the sagittal image surface and $\Delta M$ the meridional image surface; d denotes the spectral d-line, and g the spectral g-line; y denotes the image height; and the arrows indicate the loci of motion of the lens groups when zooming from the wide-angle end to the telephoto end.

DETAILED DESCRIPTION OF THE PREFERRED EMBODIMENTS

FIG. 1 to FIG. 8 in lens block diagrams show numerical examples 1 to 8 of the invention, wherein the zoom lenses each comprises a first lens group I of positive refractive power, a second lens group II of negative refractive power, a third lens group III of positive refractive power, a fourth lens group IV of positive refractive power and a fifth lens group V of negative refractive power. The arrows indicate the loci of motion of all or some of these lens groups when zooming from the wide-angle end to the telephoto end.

In the present embodiment, in order to achieve a minimization of the size of the entire lens system, the number of lens members in each lens group is made as few as possible. For this purpose, as shown in FIGS. 1 to 8, the entirety is constructed from five lens groups of predetermined refractive powers, and these lens groups are arranged upon zooming to move in such ways as shown in the drawings that they have their shares to a magnification varying effect made in good balance.

Another feature is that each lens group is made to move in such a way that, when zooming from the wide-angle end to the telephoto end, the air separation between the first lens group and the second lens group monotonously increases, the air separation between the second lens group and the third lens group monotonously decreases, and the air separation between the fourth lens group and the fifth lens group monotonously decreases.

Figure 3:
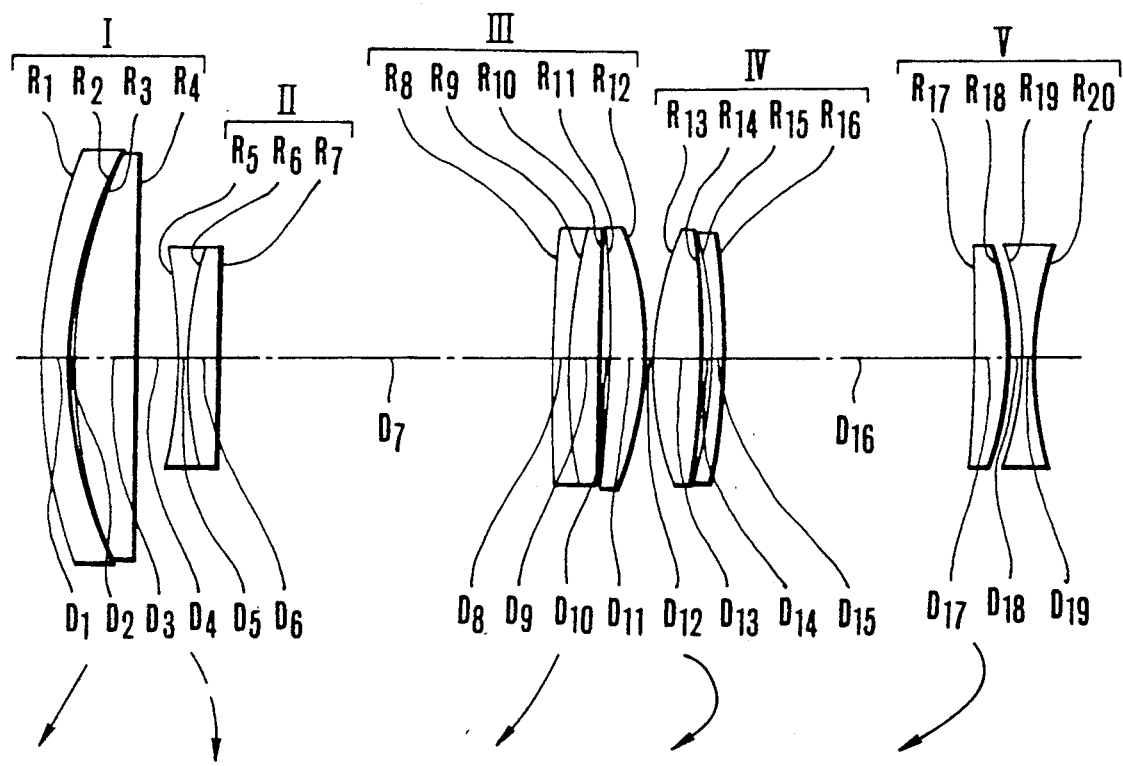

In the present embodiment, for the numerical examples 1 and 3, as shown in FIGS. 1 and 3, the first lens group and the third lens group are moved forward, and the second lens group, the fourth lens group and the fifth lens group are moved so as to depict loci convex toward the rear, when zooming is performed from the wide-angle end to the telephoto end.

Figure 2:
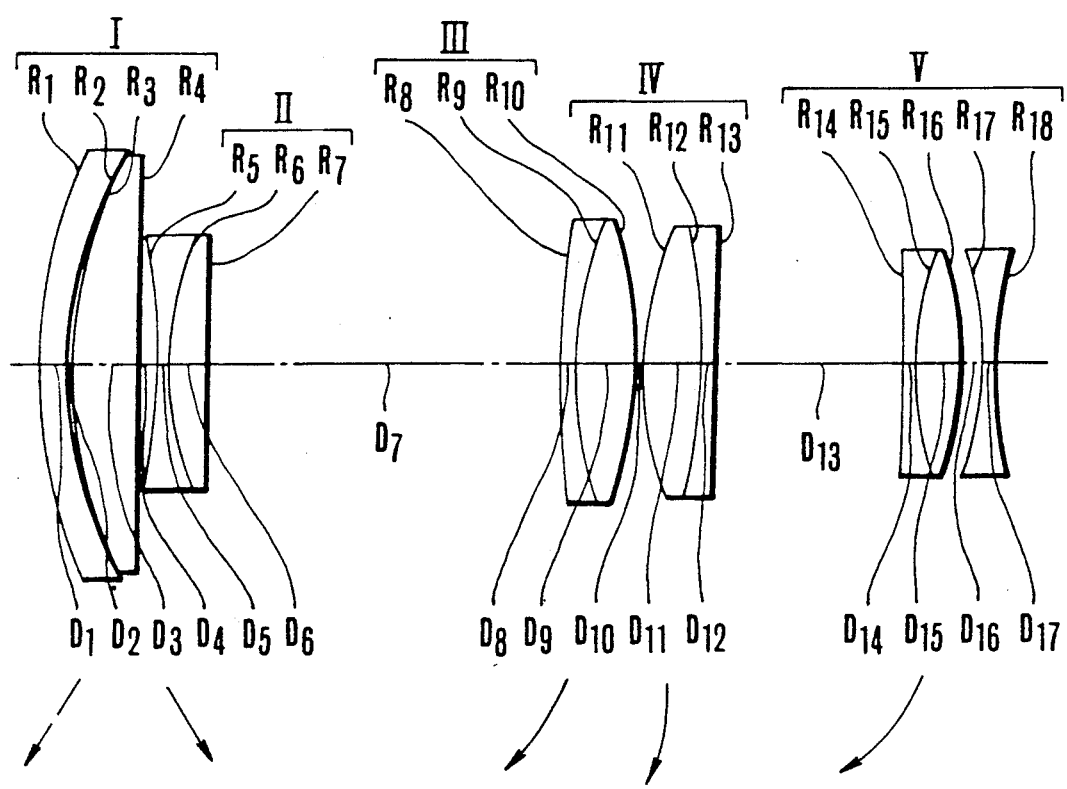

For the numerical example 2, as shown in FIG. 2, the first lens group, the third lens group and the fifth lens group are moved forward, the second lens group is moved rearward, and the fourth lens group is moved so as to depict a locus convex toward the rear, when zooming is performed from the wide-angle end to the telephoto end.

Figure 4:
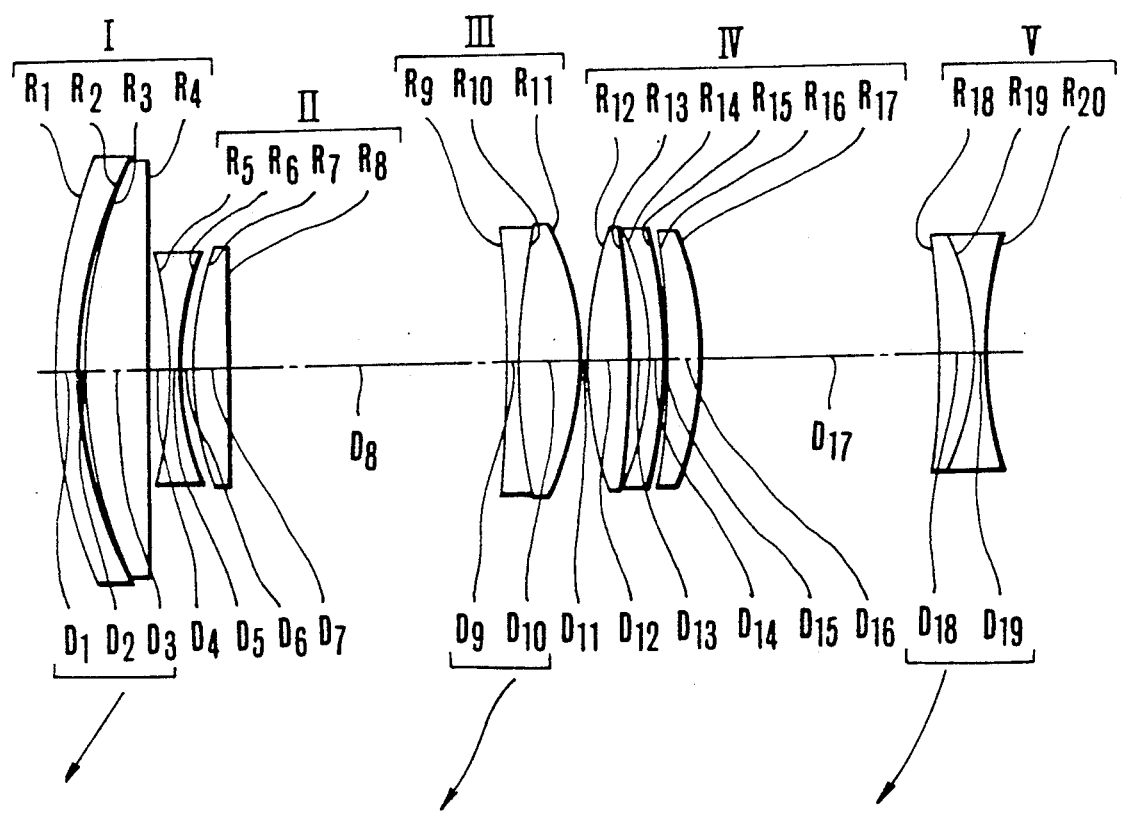
Figure 5:
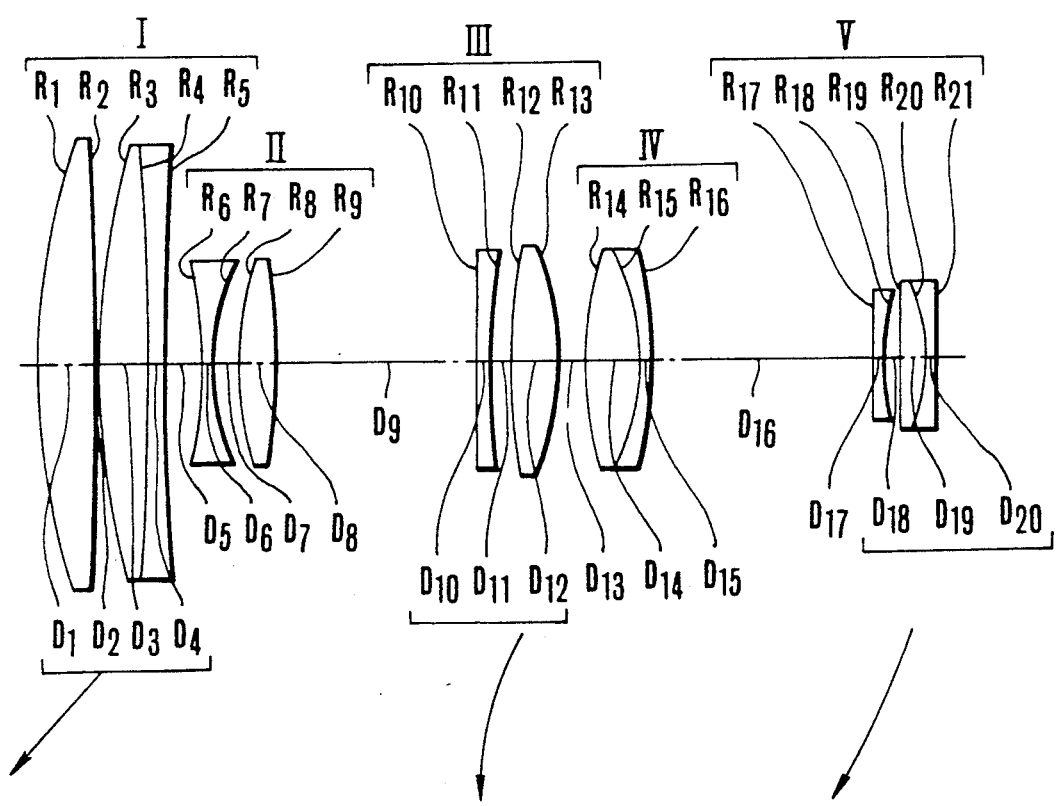
Figure 6:
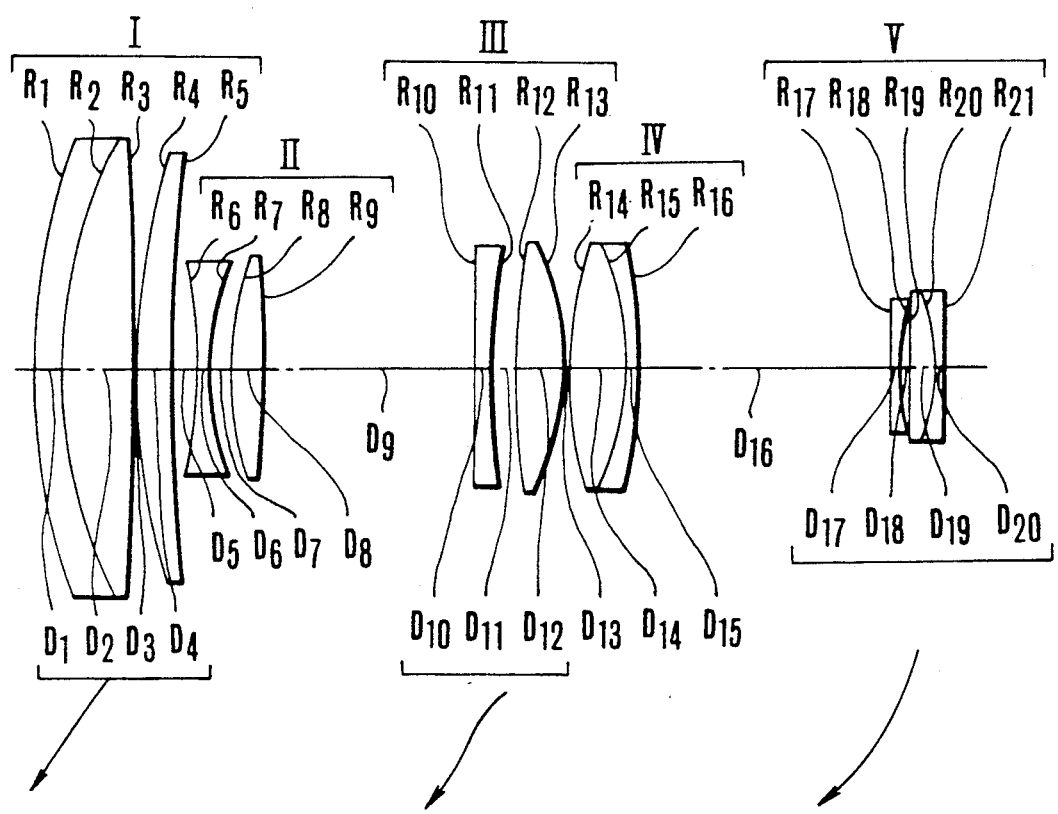

For the numerical examples 4 to 6, as shown in FIGS. 4 to 6, when zooming from the wide-angle end to the telephoto end, the second lens group and the fourth lens group are made to remain stationary, and the first, third and fifth lens groups are moved forward independently of each other.

Figure 7:
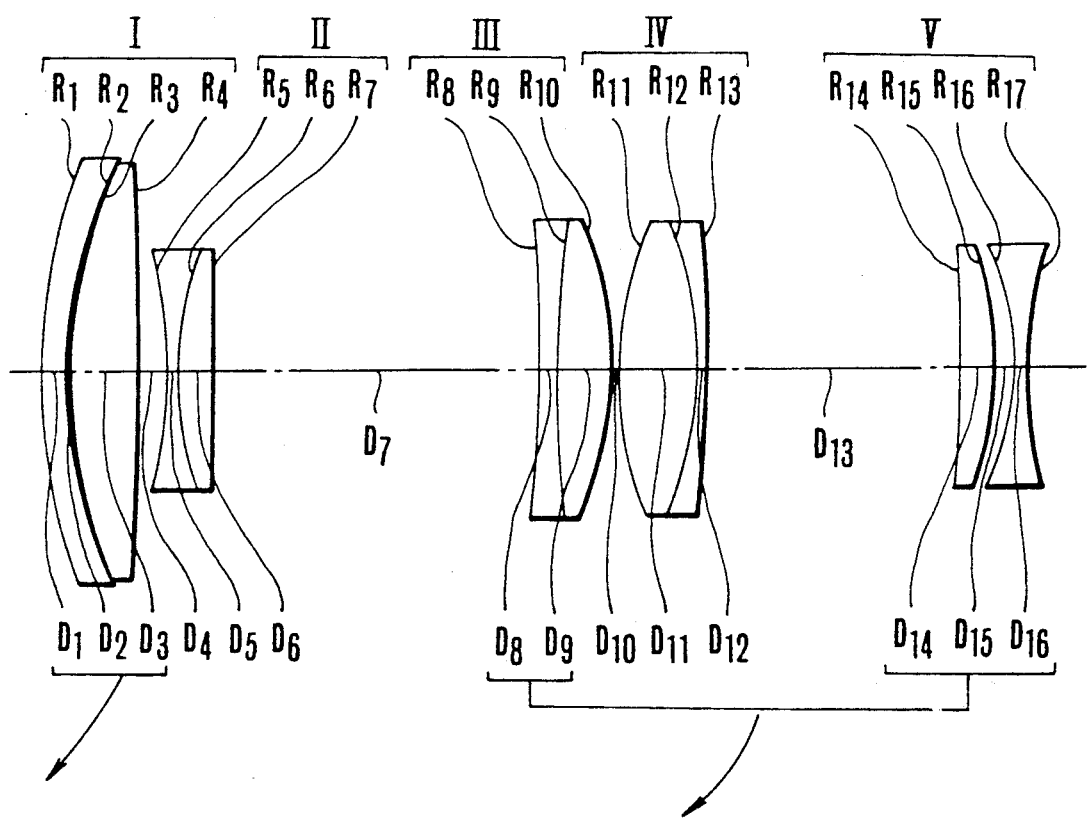
Figure 8:
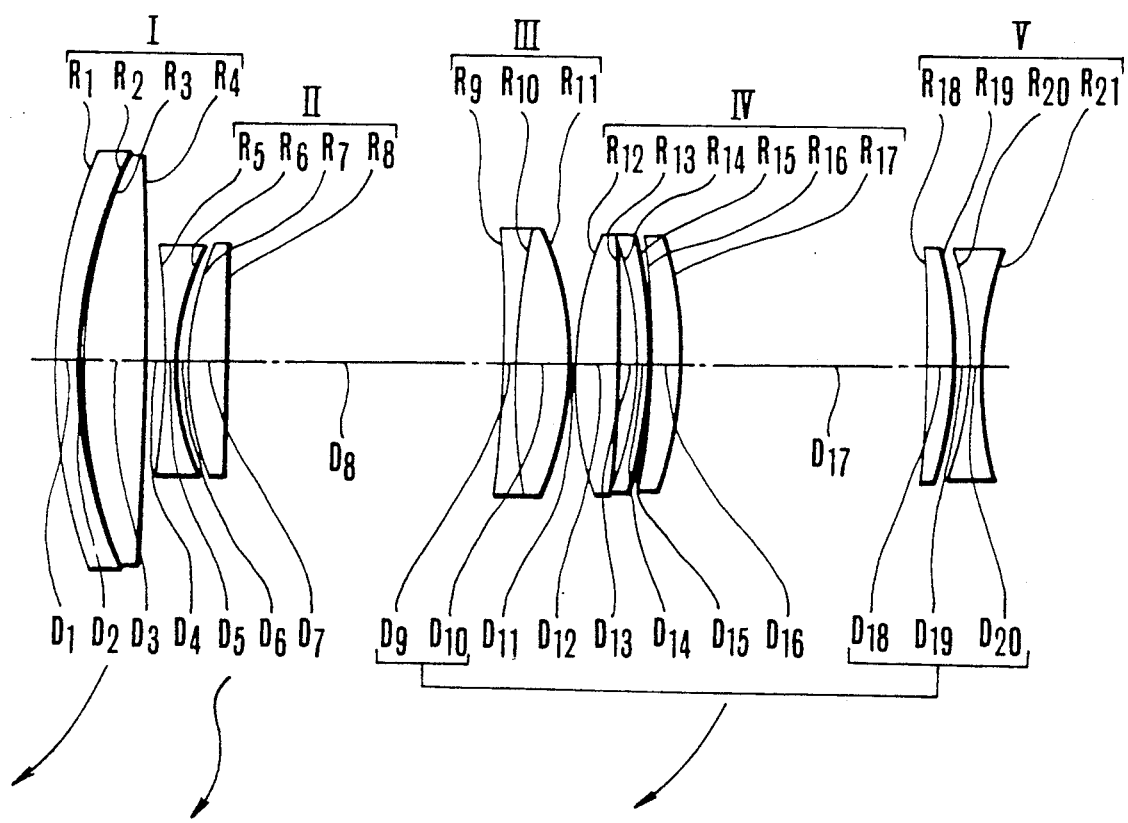
Figure 9C:
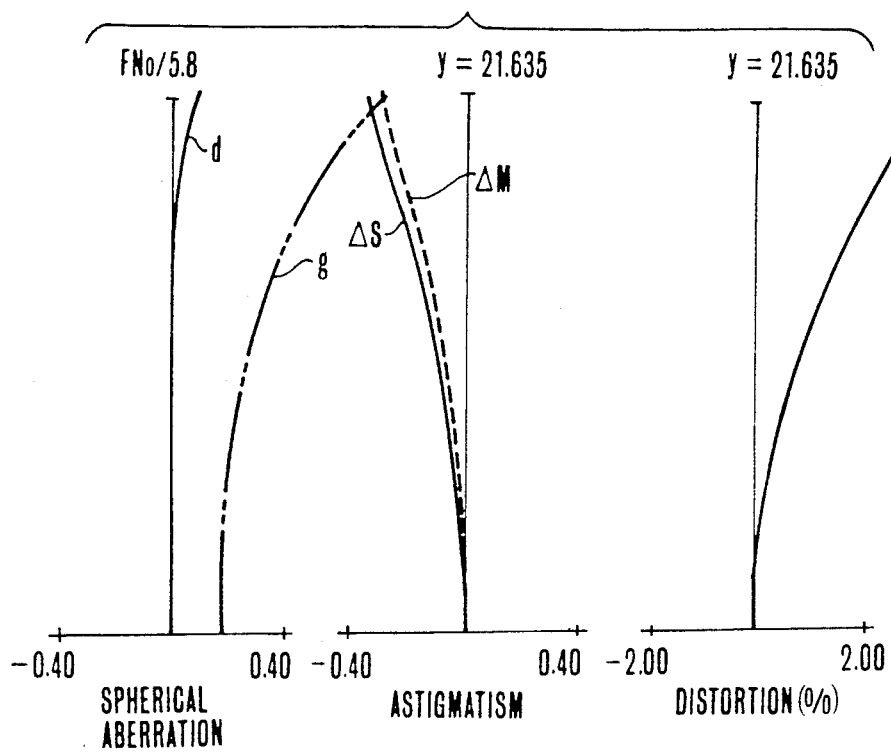
Figure 10A:
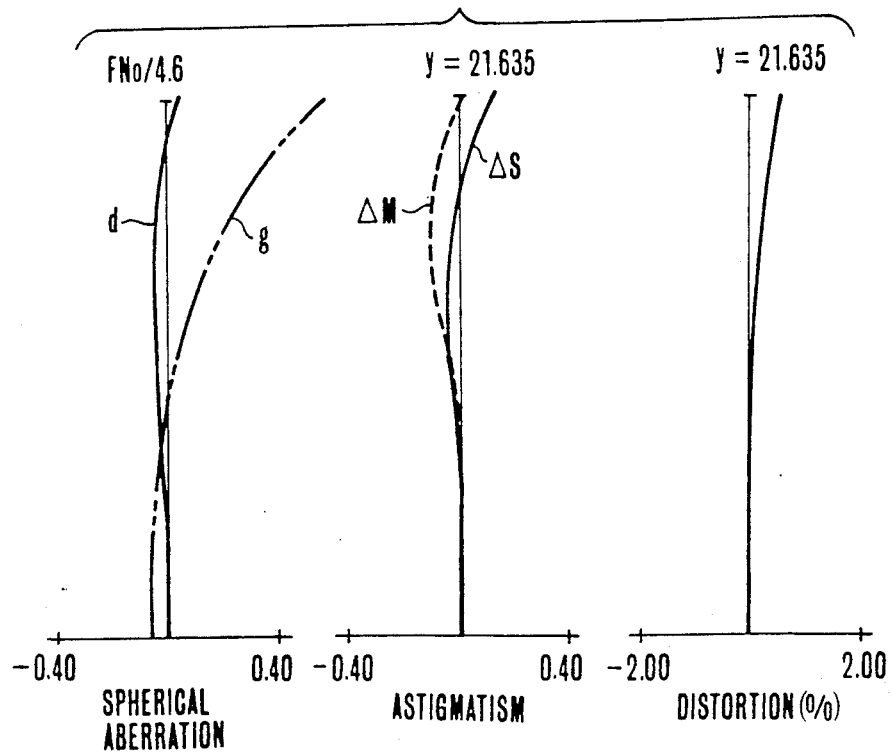
Figure 10B:
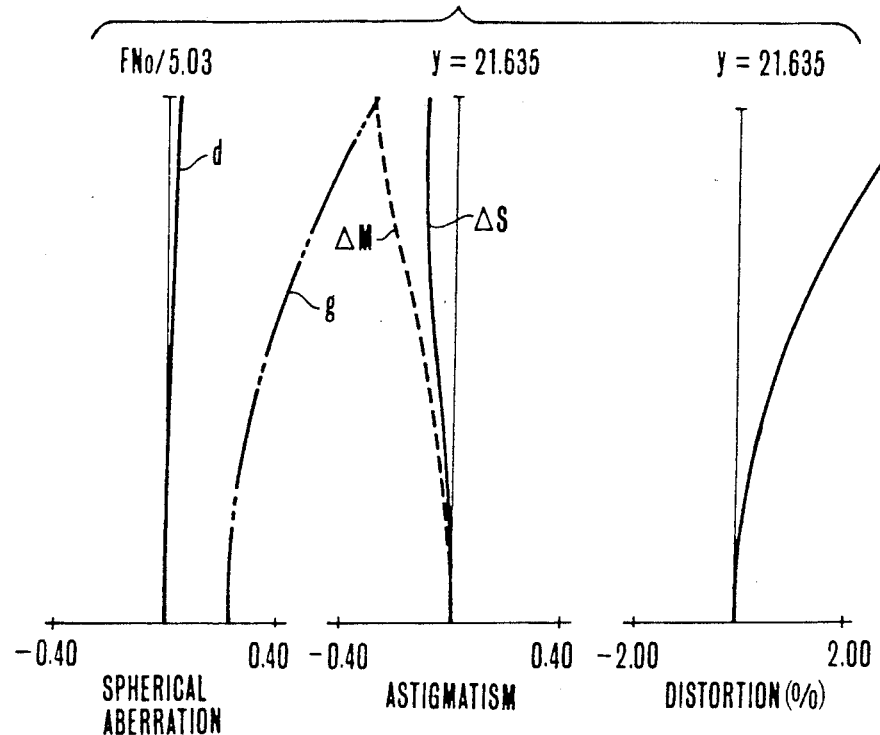
Figure 10C:
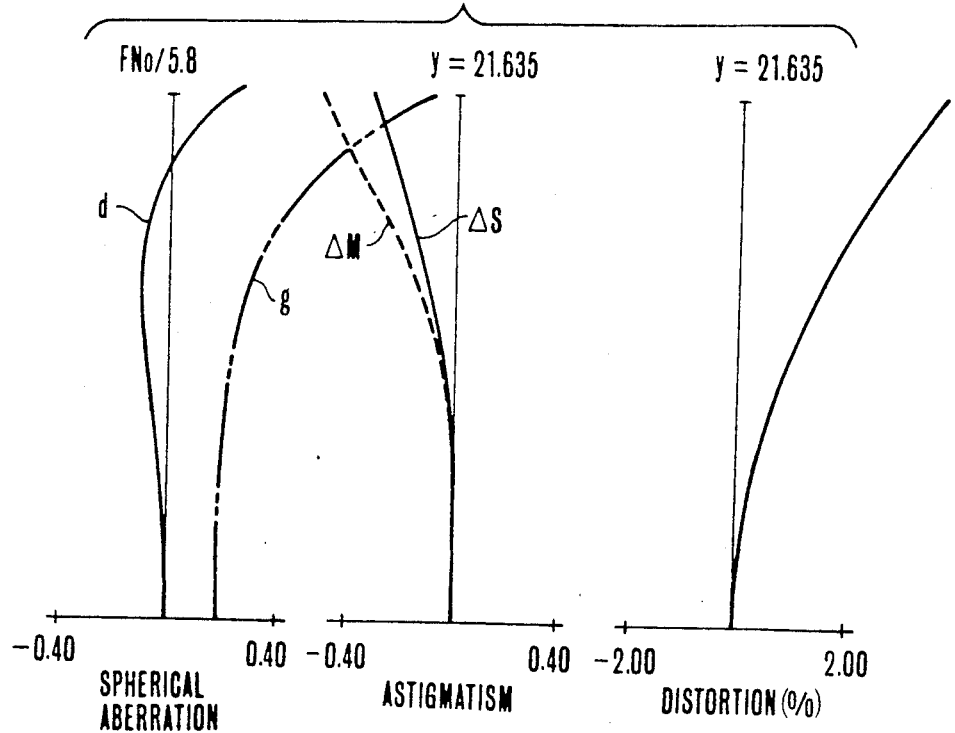
Figure 11A:
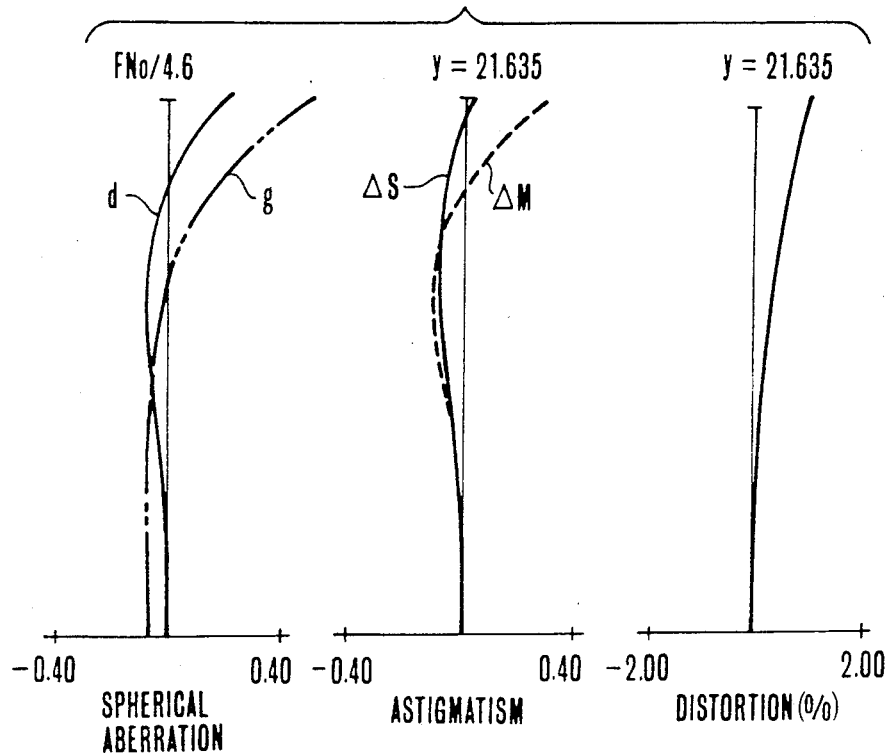
Figure 11B:
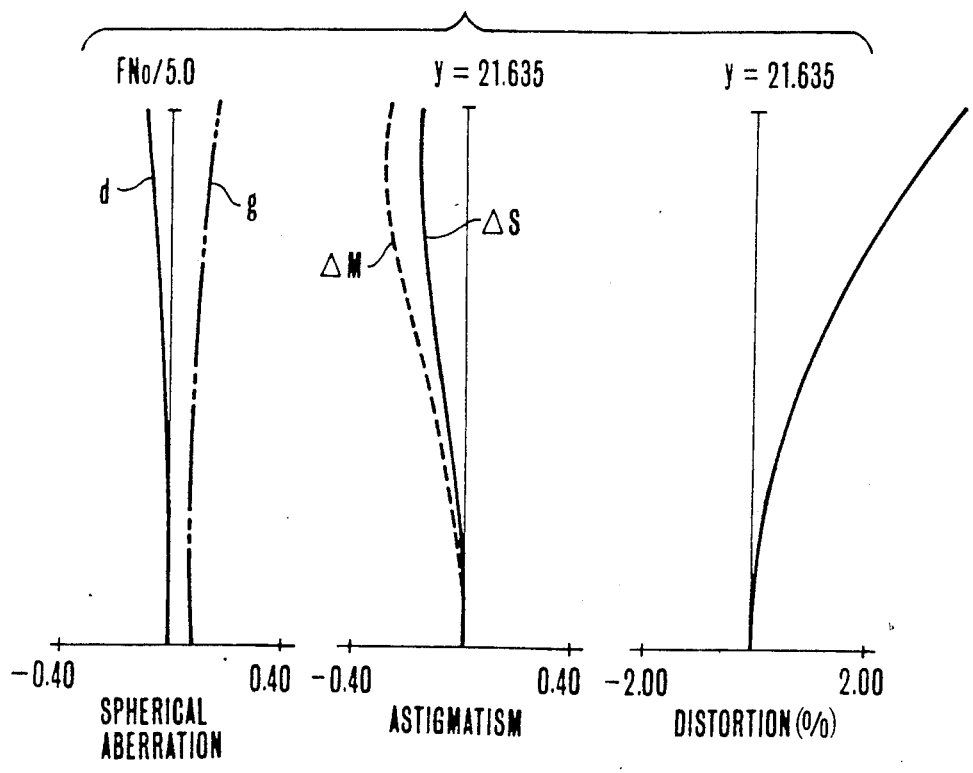
Figure 11C:
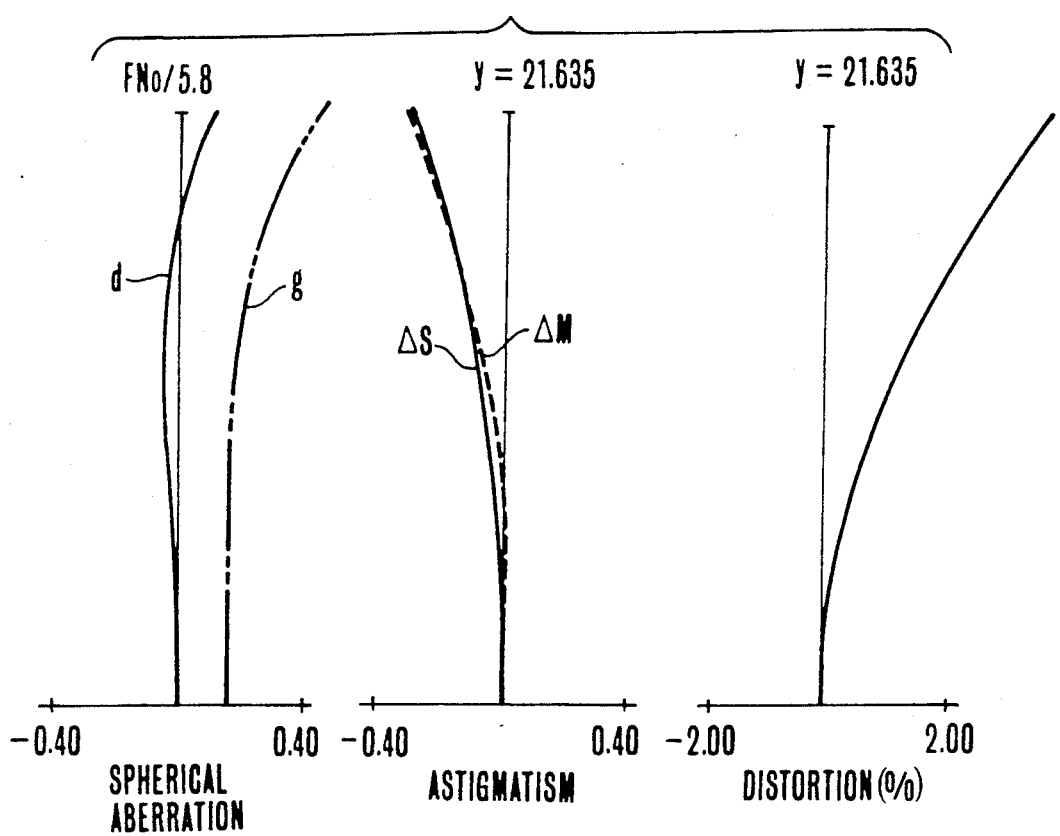
Figure 12A:
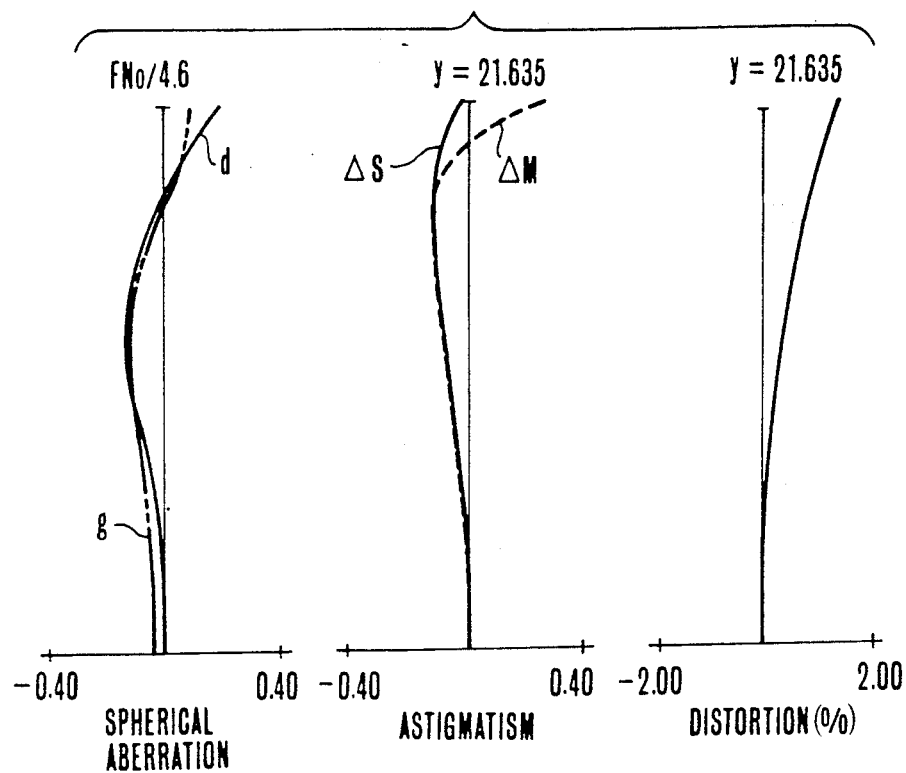
Figure 12B:
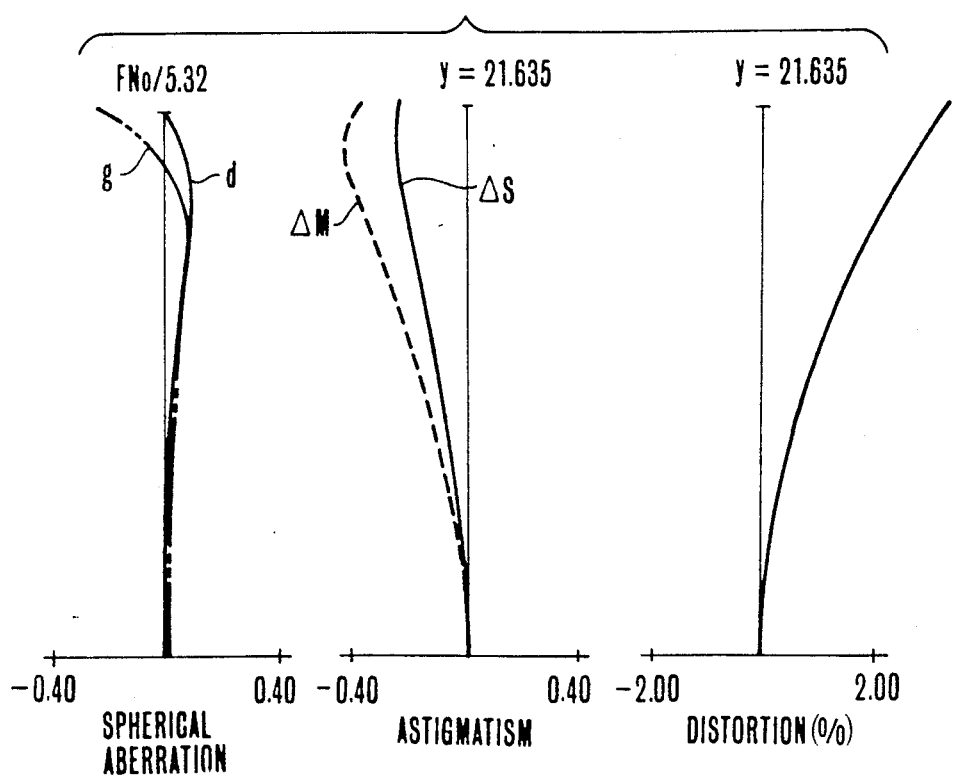
Figure 12C:
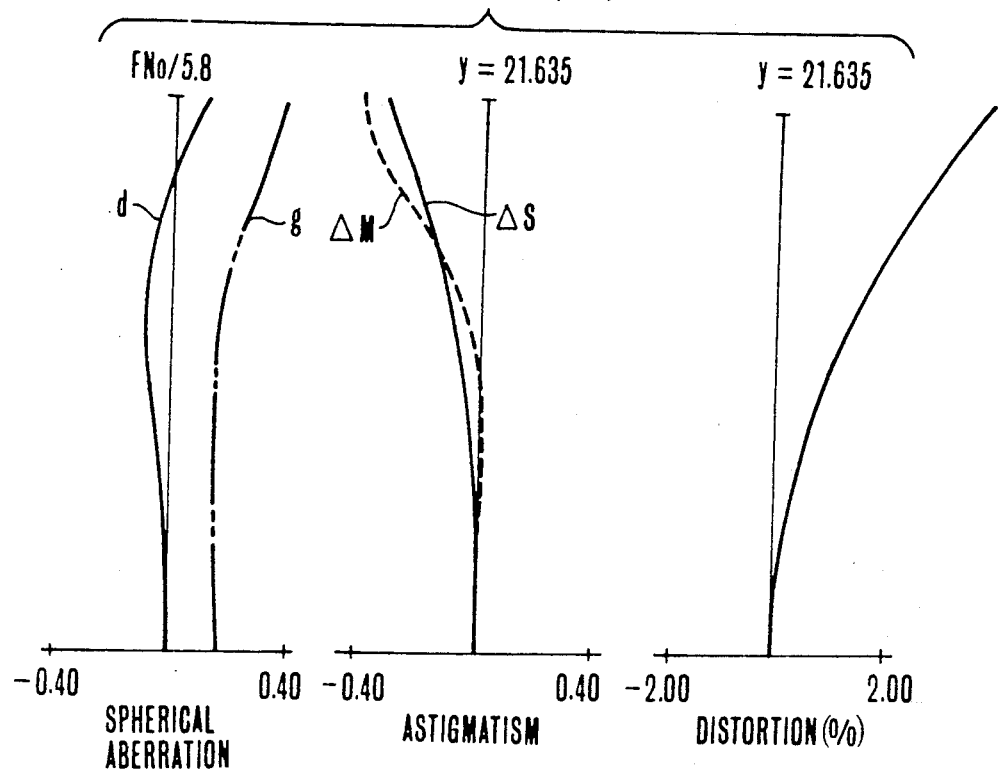
Figure 13A:
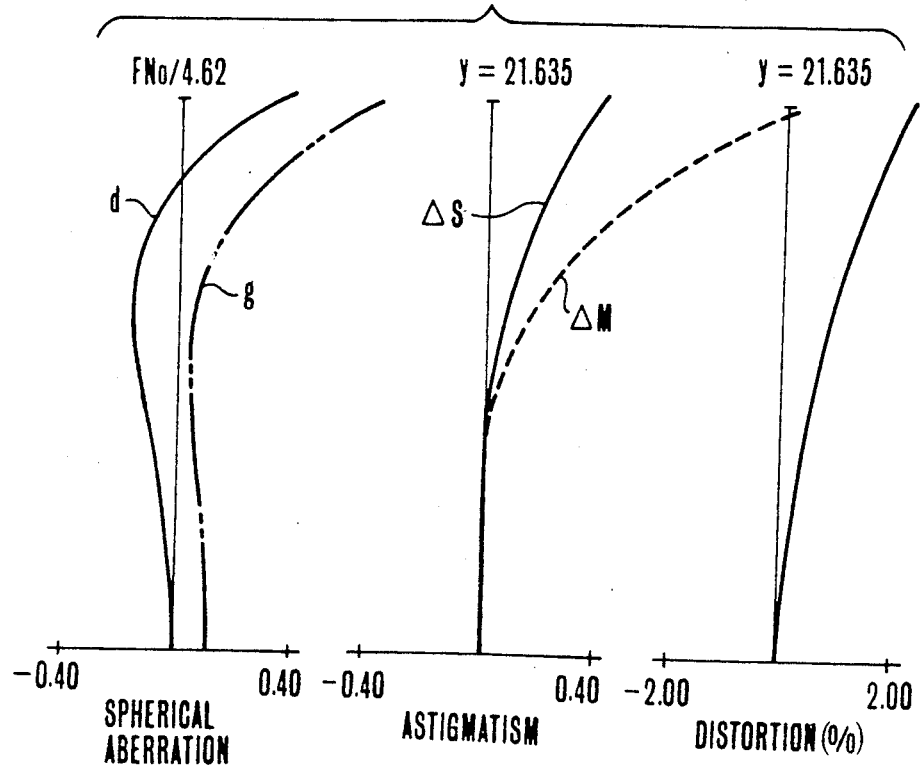
Figure 13B:
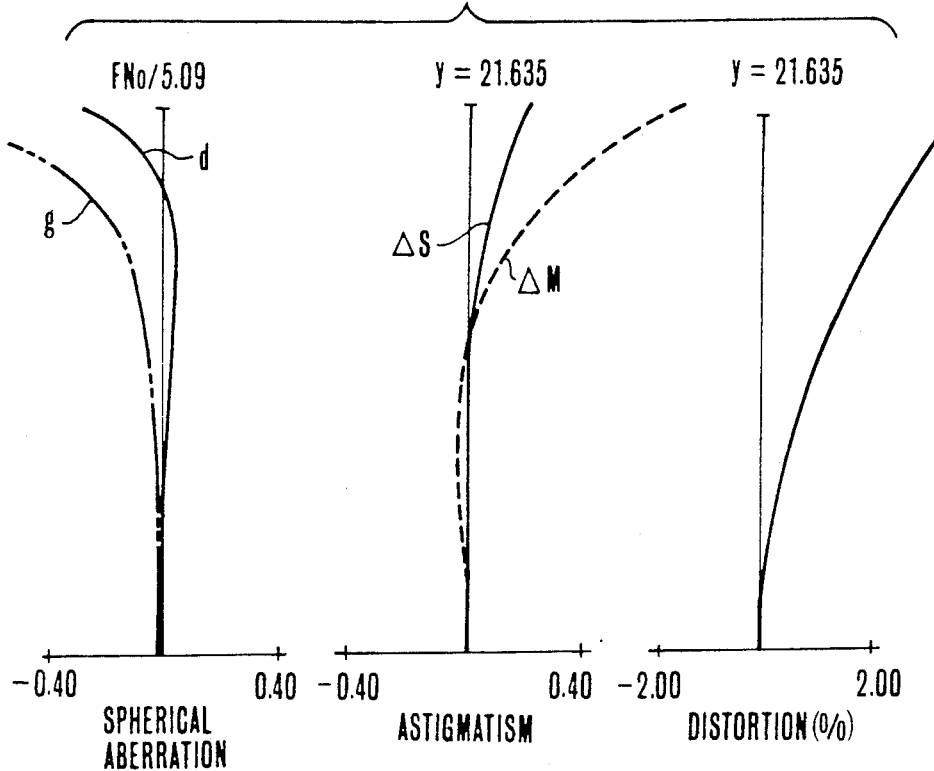
Figure 13C:
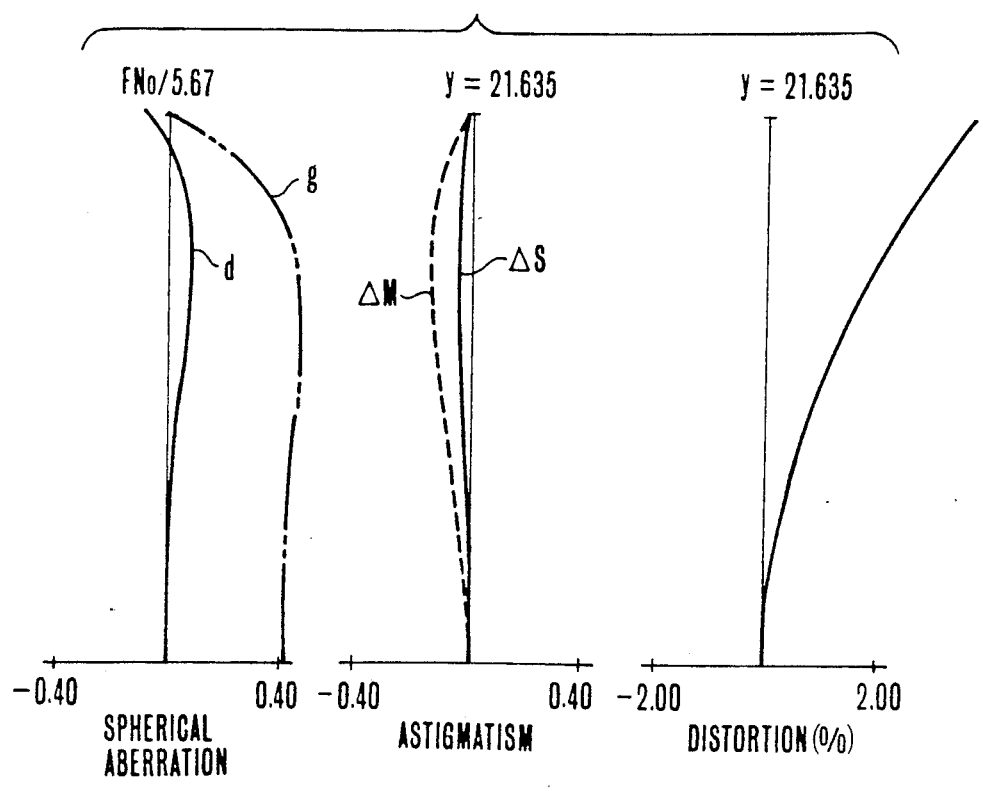
Figure 14A:
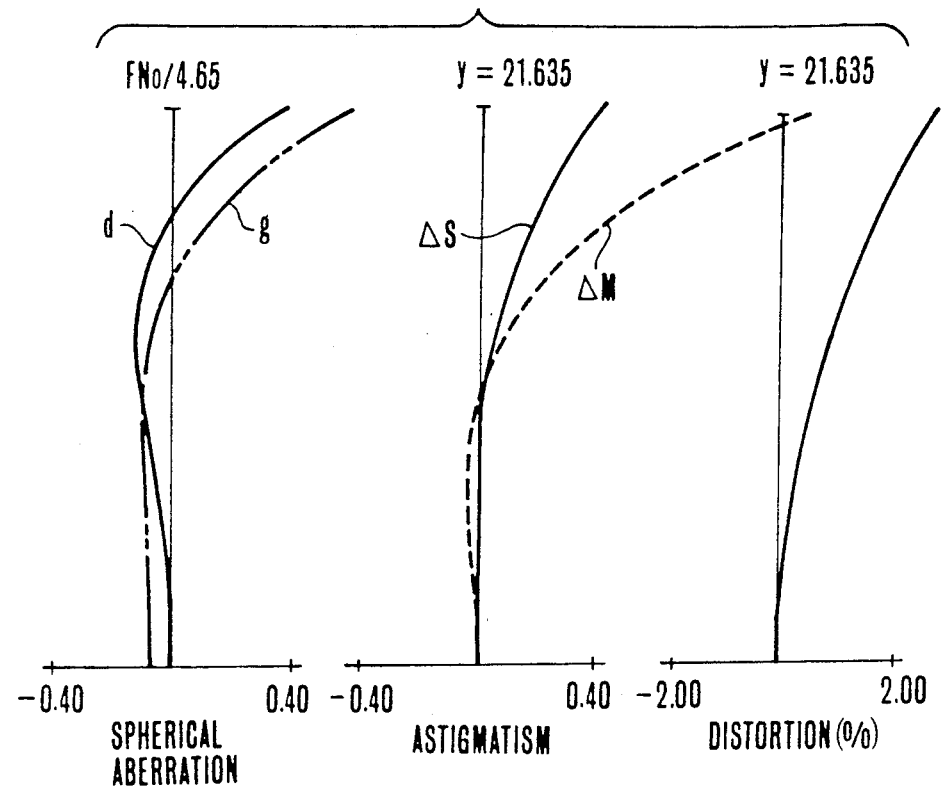
Figure 14B:
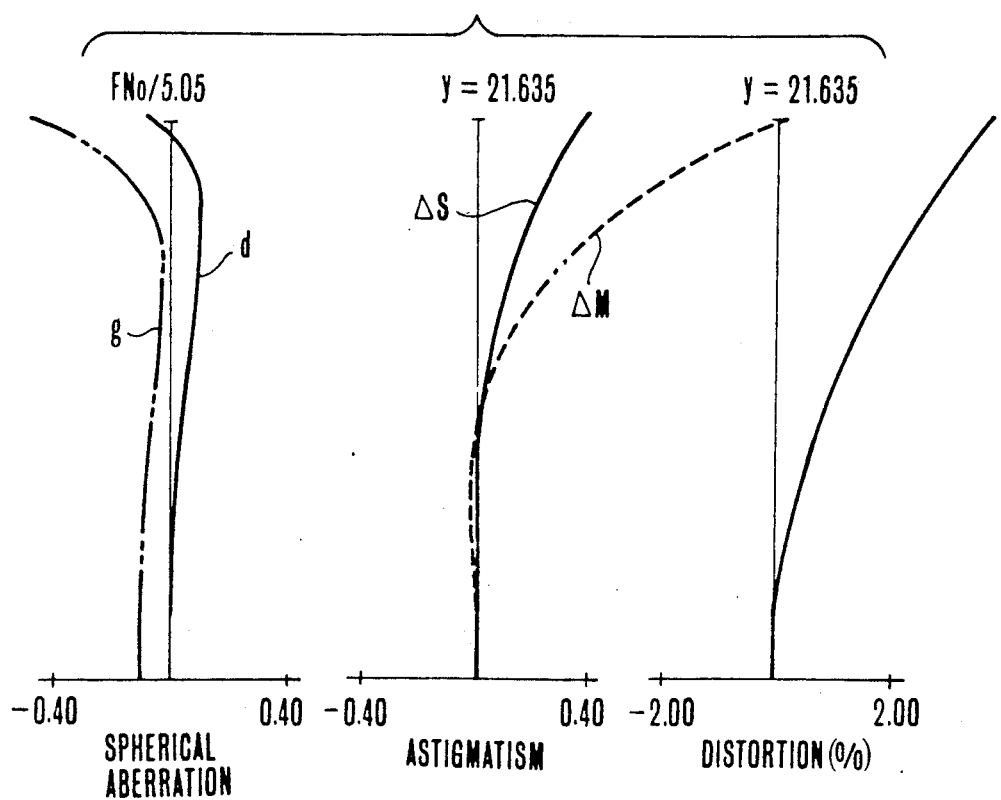
Figure 15A:
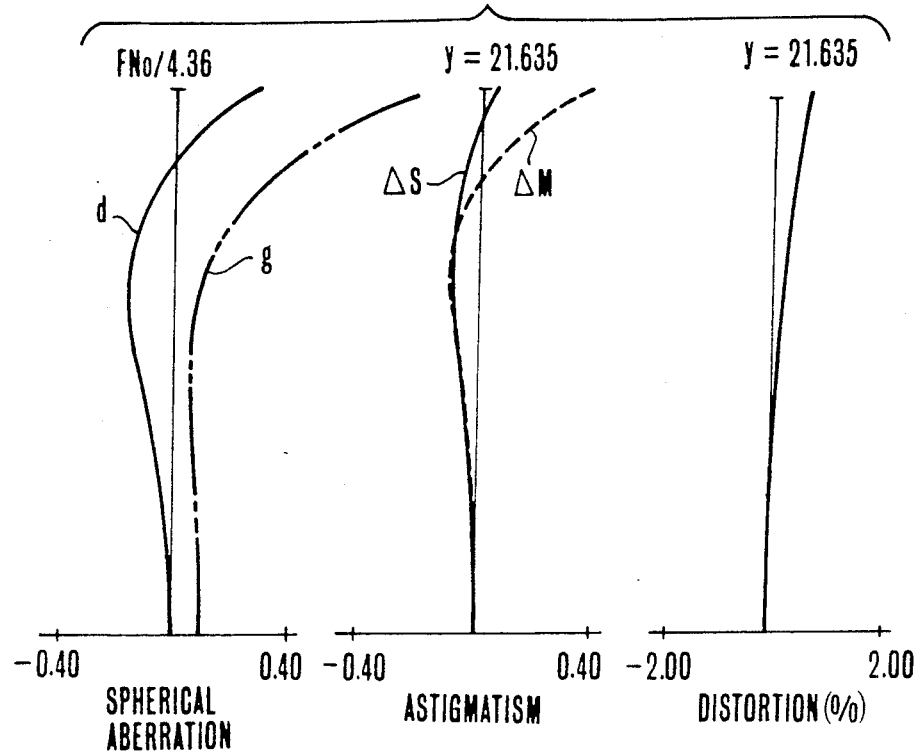
Figure 15B:
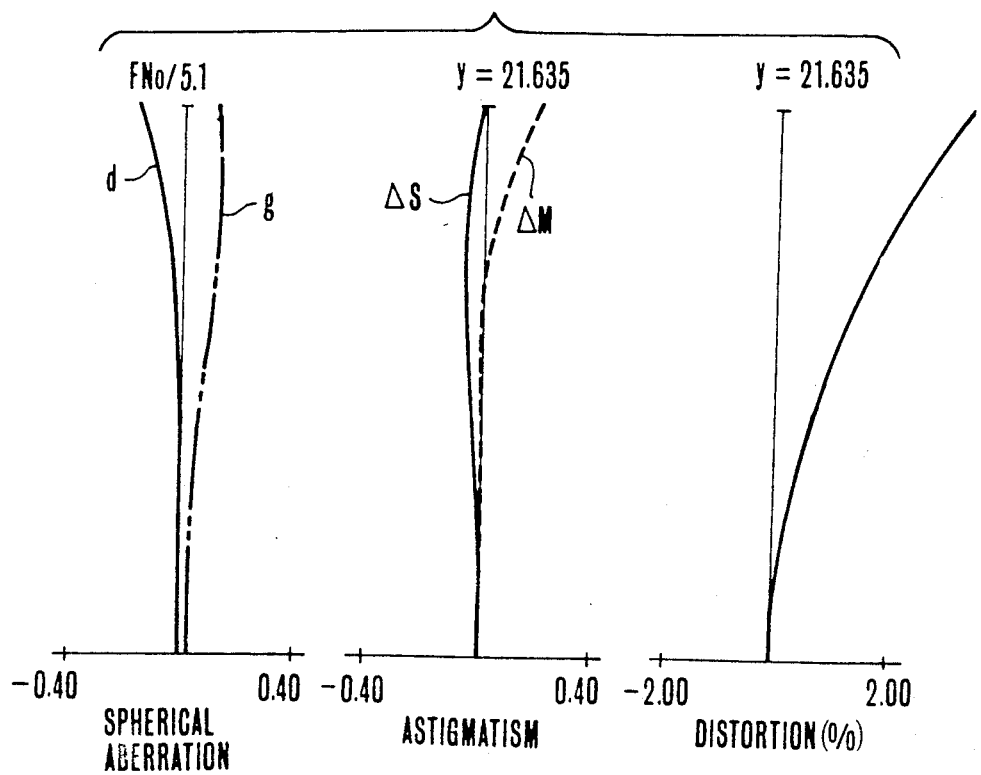
Figure 15C:
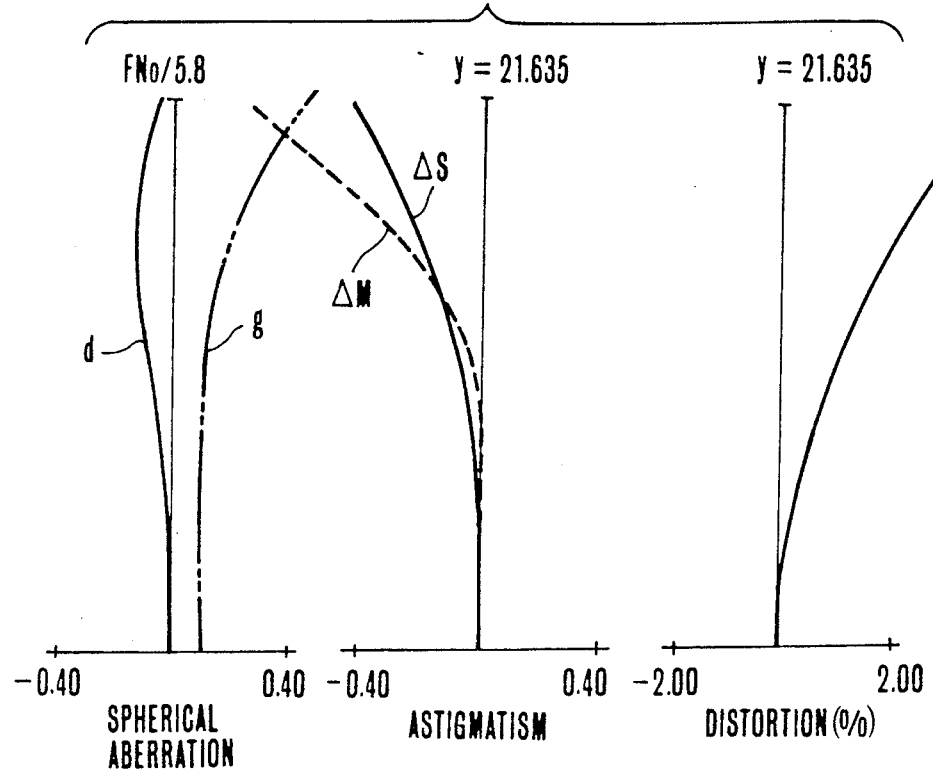
Figure 16A:
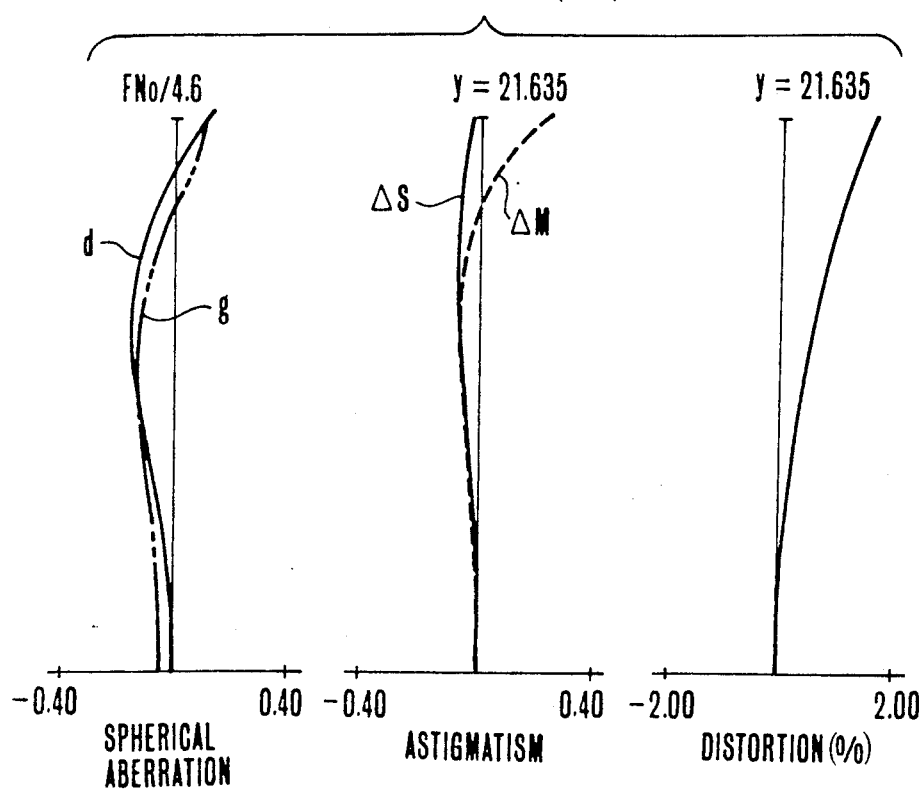
Figure 16B:
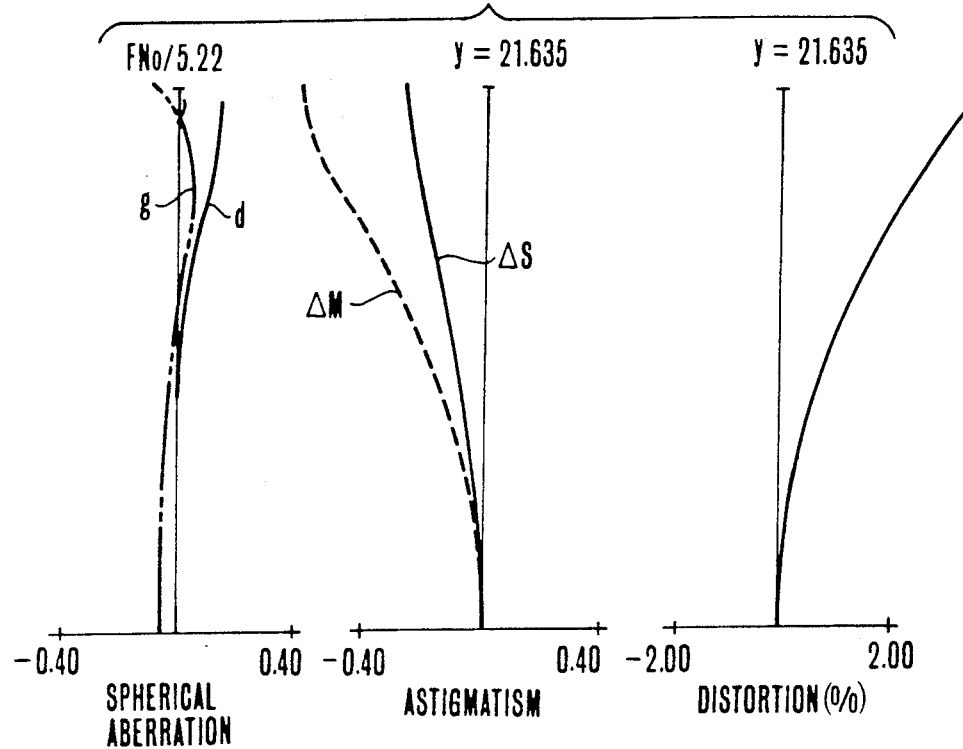
Figure 16C:
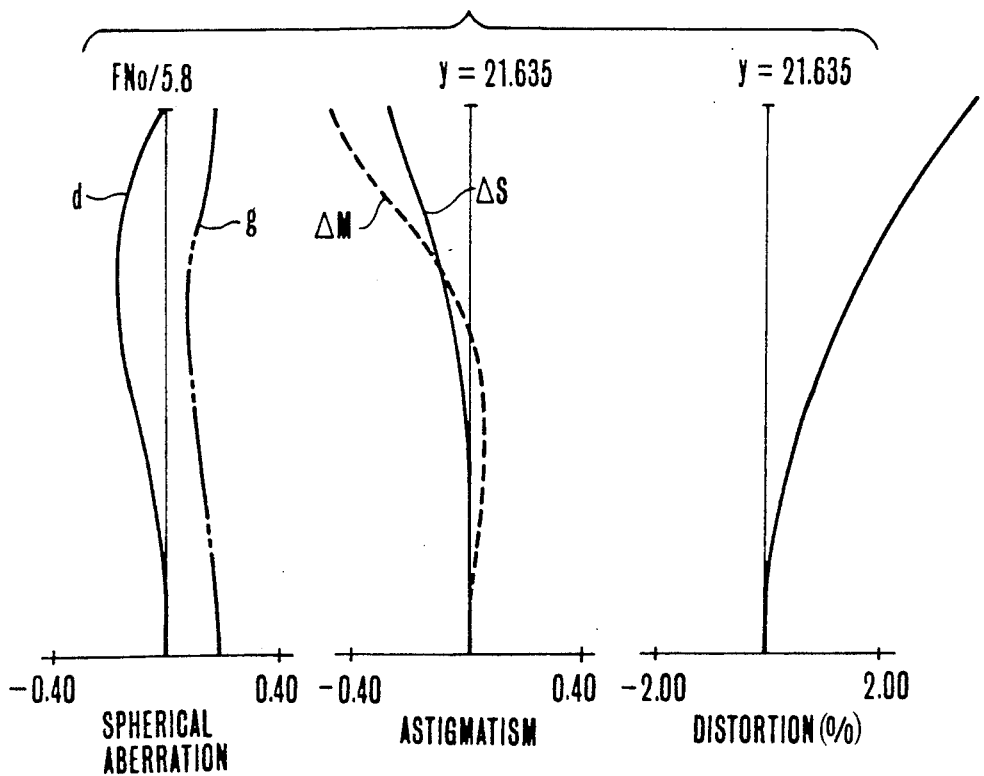

For the numerical examples 7 and 8 shown in FIGS. 7 and 8, when zooming from the wide-angle end to the telephoto end, the first lens group is moved forward, while the third lens group and the fifth lens group are simultaneously moved forward in unified relation. Of these, in the numerical example 7 of FIG. 7, the second lens group and the fourth lens group are fixed, and in the numerical example 8 of FIG. 8, though the second lens group moves, the fourth lens group is fixed.

Further, the zoom lenses of the numerical examples 1 to 8 of the invention are made to satisfy the following conditions:

$$0.15 \, fT/fW < \Delta e34/DW < 0.15 \, fT/fW \quad (1)$$

$$0.05 < f5/f12W < 0.6 \quad (2)$$

where fW and fT are focal lengths of the entire lens system at the wide-angle end and the telephoto end respectively, f5 is a focal length of the fifth lens group, f12W is an overall focal length of the first and second lens groups at the wide-angle end, $\Delta e34$ is a changed amount of the interval between principal points of the third and fourth lens groups at the telephoto end from that at the wide-angle end, and DW is the length of the entire lens system from the first lens surface to the last lens surface at the wide-angle end.

Thus, in the present embodiment, the minimization of the size of the entire lens system is achieved in such a manner that the back focal distance does not become unnecessarily long. For this purpose, the refractive powers and paraxial arrangement of all the lens groups are so determined that the entire lens system, when in the wide-angle end, does not get too strong in the inverted telephoto type, in other words, becomes to be of a relatively weak inverted telephoto type.

Next, the technical significance of each of the above-described conditions is explained.

The inequalities of condition (1) define a range for the amount of change of the interval between the principal points of the third and fourth lens groups when zooming from the wide-angle end to the telephoto end relative to the total length of the lens at the wide-angle end. When the principal point interval between the third and fourth lens groups becomes too long beyond the upper limit of the inequalities of condition (1), a necessity arises that the space for their zooming movement be secured so large that they do not interfere with each other in the wide-angle end. As a result, the total length of the lens in the wide-angle end increases objectionably.

Further, when the lower limit of the inequalities of condition (1) is exceeded, the principal point interval between the third and fourth lens groups becomes too short in the telephoto end. To fulfill both of the requirements of obtaining the desired zoom ratio and of shortening the optical total length in the wide-angle end, therefore, the zoom strokes of the first lens group and the fifth lens group must be increased. Therefore, this is not advantageous.

The inequalities of condition (2) define a range for the ratio of the focal length of the fifth lens group to the overall focal length of the first and second lens groups. When the negative refractive power of the fifth lens group becomes too weak beyond the upper limit of the inequalities of condition (2), the distortion tends to decrease, but a necessity arises that the spacing between the fourth and fifth lens groups in the wide-angle end be taken wide in order to obtain the desired zoom ratio. Further, when in the wide-angle end, the back focal distance becomes longer than necessary. Hence, it becomes difficult to achieve an advance in the compactness of the entire lens system.

Further, when the lower limit of the inequalities of condition (2) is exceeded, the negative refractive power of the fifth lens group becomes too strong to ease the difficulty of well correcting aberrations over the entire area of the image frame, since large pincushion distortion is produced and the Petzval sum increases in the negative direction. Therefore, it is not desirable.

To achieve a good correction of the variation of aberrations with zooming for good stability of optical performance throughout the entire zooming range, the invention now sets forth the following condition:

$$-3.5 < f12W/fW < -1.3 \quad (3)$$

The inequalities of condition (3) define a range for the ratio of the overall focal length of the first and second lens groups in the wide-angle end to the shortest focal length of the entire system. When this condition is satisfied, an improvement of the compact form of the entire lens system can be attained particularly with the back focal distance made to be of the optimum length, while still suppressing the variation of aberrations with zooming.

When the upper limit of the inequalities of condition (3) is exceeded, the overall negative refractive power of the first and second lens groups becomes too weak. This is advantageous at reduction of the outer diameters of the third lens group and those that follow, and, in a case where the diaphragm is positioned on the image side of the second lens group, at shortening of the outer diameter of the lens barrel owing to the reduction of the diameter of the diaphragm. But, the requirements of securing the necessary back focal distance and of minimizing the physical length of the entire lens system can hardly be fulfilled at once. It is also required to strengthen the negative refractive power of the fifth lens group. This results in increasing the pincushion distortion.

Further, when the overall negative refractive power of the first and second lens groups is too much strong as exceeding the lower limit of the inequalities of condition (3), the back focal distance becomes too long. Hence, the entire lens system is caused to increase in the longitudinal direction. And the various aberrations, particularly the spherical aberration and the curvature of field, vary to larger extent. To secure the necessary minimum F-number, the diameter of the diaphragm has to be increased. Thus, the lens barrel is increased also in the lateral direction. Therefore, it is not desirable.

To achieve a further minimization of the bulk and size of the entire lens system while still preserving high optical performance throughout the entire zooming range, the invention sets forth the following condition, too:

$$0.35 < f3/f4 < 2.5 \quad (4)$$

where f3 and f4 are focal lengths of the third and fourth lens groups respectively.

The inequalities of condition (4) define a range for the ratio of the focal length of the third lens group to the focal length of the fourth lens group. When the positive refractive power of the third lens group is too much weak as exceeding the upper limit of the condition (4), the spacing between the fourth and fifth lens groups in the wide-angle end has to be taken at a large value. Otherwise, the predetermined zoom ratio could not be obtained. Hence, it becomes difficult to attain an improved result of the compact form of the lens system. If the desired compactness of the lens system is retained, the refractive power of the second lens group or the fifth lens group must be strengthened. This results in an increase in the difficulty of well correcting aberrations.

Further, when the lower limit of the condition (4) is exceeded, the refractive power of the third lens group becomes too much strong. Therefore, the third lens group produces large aberrations. Particularly the spherical aberration gets larger, which is hardly corrected in good balance by the design of the other lens groups.

When all the foregoing conditions are satisfied, realization of a zoom lens the invention aims at can be achieved. Yet, to assist in simultaneous fulfillment of the requirements of achieving a much desired minimization of the bulk and size of the entire lens system and of stabilizing the aberrations against zooming for high optical performance, it is preferred in the present embodiment that the first lens group counting from the front is constructed from a meniscus-shaped negative lens convex toward the front and a positive lens, the second lens group is constructed from a cemented doublet consisting of a negative lens in bi-concave form and a positive lens, the third lens group is constructed with inclusion of a negative lens and at least one positive lens, the fourth lens group is constructed with inclusion of at least one positive lens and at least one negative lens, and the fifth lens group is constructed from at least one positive lens and at least one negative lens in bi-concave form.

Alternatively, it is preferred that the first lens group is constructed from a negative lens and at least one positive lens, the second lens group is constructed from a negative lens in bi-concave form and a positive lens, the third lens group is constructed with inclusion of a negative lens and a positive lens, the fourth lens group is constructed with inclusion of at least one positive lens and at least one negative lens, and the fifth lens group is constructed from at least one positive lens and at least one negative lens.

Further, in application of the invention to the case shown in FIGS. 4 to 6 where the second lens group and the fourth lens group are fixed, and, when zooming from the wide-angle end to the telephoto end, the first, third and fifth lens groups are moved forward according to respective different loci from each other, it is preferred to set forth the ranges for the factors of the before-described inequalities of conditions as follows:

$$0.05\, fT/fW < \Delta e34/DW < 0.11\, fT/fW$$
$$0.05 < f5/f12W < 0.17$$
$$-3.5 < f12W/fW < -2$$
$$0.85 < f3/f4 < 2.5$$

Meanwhile, in application to the case shown in FIGS. 7 and 8 where when zooming from the wide-angle end to the telephoto end, the fourth lens group remains stationary, the first lens group moves forward, and the third lens group and the fifth lens group move forward in unison, it is preferred to set forth the ranges for the factors of the before-described inequalities of conditions as follows:

$$0.09\, fT/fW < \Delta e34/DW < 0.15\, fT/FW$$
$$0.16 < f5/f12W < 0.28$$
$$-2.7 < f12W/fW < -1.7$$
$$1.2 < f3/f4 < 2.2$$

The examples 1 to 8 of specific zoom lenses of the invention can be constructed in accordance with the numerical data given in the tables below for the radii of curvature, R, the axial thicknesses or air separations, D, and the refractive indices, N, and the Abbe numbers, $\nu$, of the glasses of the lens elements with the subscripts numbered consecutively from front to rear.

The numerical values of the factors of the before-described inequalities of conditions (1) to (4) for the numerical examples 1 to 8 are listed in Table 1.

| Numerical Example 1 (FIGS. 1 and 9(A) to 9(C)) | | | |
| --- | --- | --- | --- |
| R1 = 53.18 | D1 = 1.8 | N1 = 1.80518 | $\nu$1 = 25.4 |
| R2 = 38.56 | D2 = 0.46 | | |
| R3 = 41.07 | D3 = 5.0 | N2 = 1.60311 | $\nu$2 = 60.7 |
| R4 = −652.73 | D4 = Variable | | |
| R5 = −45.40 | D5 = 1.2 | N3 = 1.78590 | $\nu$3 = 44.2 |
| R6 = 40.44 | D6 = 2.5 | N4 = 1.80518 | $\nu$4 = 25.4 |
| R7 = −742.47 | D7 = Variable | | |
| R8 = −323.47 | D8 = 1.21 | N5 = 1.84666 | $\nu$5 = 23.9 |
| R9 = 76.33 | D9 = 4.2 | N6 = 1.51633 | $\nu$6 = 64.1 |
| R10 = −28.78 | D10 = Variable | | |
| R11 = 30.62 | D11 = 3.6 | N7 = 1.53172 | $\nu$7 = 48.9 |

-continued

Numerical Example 1
(FIGS. 1 and 9(A) to 9(C))

| | | | |
|---|---|---|---|
| R12 = −90.86 | D12 = 0.67 | | |
| R13 = −47.34 | D13 = 1.2 | N8 = 1.80518 | ν8 = 25.4 |
| R14 = −80.98 | D14 = Variable | | |
| R15 = −89.47 | D15 = 2.8 | N9 = 1.84666 | ν9 = 23.9 |
| R16 = −20.36 | D16 = 1.2 | N10 = 1.80610 | ν10 = 40.9 |
| R17 = 40.052 | | | |

Separations during Zooming

| Focal Length | D4 | D7 | D10 | D14 |
|---|---|---|---|---|
| 82.80 | 2.04 | 26.46 | 0.50 | 18.86 |
| 134.58 | 30.72 | 15.97 | 9.95 | 10.12 |
| 193.13 | 41.91 | 9.45 | 15.36 | 1.79 |

Numerical Example 2
(FIGS. 2 and 10(A) to 10(C))

| | | | |
|---|---|---|---|
| R1 = 47.00 | D1 = 1.8 | N1 = 1.80518 | ν1 = 25.4 |
| R2 = 35.83 | D2 = 0.33 | | |
| R3 = 38.06 | D3 = 5.0 | N2 = 1.60311 | ν2 = 60.7 |
| R4 = 635.05 | D4 = Variable | | |
| R5 = −48.21 | D5 = 1.0 | N3 = 1.83400 | ν3 = 37.2 |
| R6 = 26.07 | D6 = 2.8 | N4 = 1.84666 | ν4 = 23.9 |
| R7 = 454.86 | D7 = Variable | | |
| R8 = 111.79 | D8 = 1.0 | N5 = 1.84666 | ν5 = 23.9 |
| R9 = 32.21 | D9 = 4.9 | N6 = 1.60311 | ν6 = 60.7 |
| R10 = −36.41 | D10 = Variable | | |
| R11 = 27.44 | D11 = 4.6 | N7 = 1.51118 | ν7 = 51.0 |
| R12 = −52.08 | D12 = 1.0 | N8 = 1.70154 | ν8 = 41.2 |
| R13 = 476.11 | D13 = Variable | | |
| R14 = −174.26 | D14 = 1.0 | N9 = 1.77250 | ν9 = 49.6 |
| R15 = 27.30 | D15 = 3.9 | N10 = 1.69895 | ν10 = 30.1 |
| R16 = −28.43 | D16 = 1.33 | | |
| R17 = −27.74 | D17 = 1.1 | N11 = 1.83481 | ν11 = 42.7 |
| R18 = 38.84 | | | |

Separations during Zooming

| Focal Length | D4 | D7 | D10 | D13 | D18 |
|---|---|---|---|---|---|
| 82.80 | 1.86 | 28.14 | 0.45 | 15.51 | 0.00 |
| 135.11 | 25.29 | 14.12 | 13.11 | 8.62 | 3.74 |
| 193.01 | 39.16 | 4.31 | 18.30 | 0.85 | 13.39 |

Numerical Example 3
(FIGS. 3 and 11(A) to 11(C))

| | | | |
|---|---|---|---|
| R1 = 54.48 | D1 = 1.8 | N1 = 1.80518 | ν1 = 25.4 |
| R2 = 39.05 | D2 = 0.46 | | |
| R3 = 41.07 | D3 = 5.0 | N2 = 1.60311 | ν2 = 60.7 |
| R4 = −2567.77 | D4 = Variable | | |
| R5 = −43.61 | D5 = 1.0 | N3 = 1.78590 | ν3 = 44.2 |
| R6 = 35.57 | D6 = 2.5 | N4 = 1.80518 | ν4 = 25.4 |
| R7 = −3509.73 | D7 = Variable | | |
| R8 = 286.71 | D8 = 1.2 | N5 = 1.84666 | ν5 = 23.9 |
| R9 = 46.34 | D9 = 2.5 | N6 = 1.60311 | ν6 = 60.7 |
| R10 = 574.49 | D10 = 0.7 | | |
| R11 = −145.33 | D11 = 3.0 | N7 = 1.55333 | ν7 = 46.2 |
| R12 = −30.25 | D12 = Variable | | |
| R13 = 32.53 | D13 = 3.6 | N8 = 1.52325 | ν8 = 58.5 |
| R14 = −89.84 | D14 = 0.67 | | |
| R15 = −49.02 | D15 = 1.2 | N9 = 1.80518 | ν9 = 25.4 |
| R16 = −81.73 | D16 = Variable | | |
| R17 = −204.86 | D17 = 2.8 | N10 = 1.84666 | ν10 = 23.9 |
| R18 = −30.48 | D18 = 1.0 | | |
| R19 = −28.03 | D19 = 1.0 | N11 = 1.80610 | ν11 = 40.9 |
| R20 = 40.26 | | | |

Separations during Zooming

| Focal Length | D4 | D7 | D12 | D16 |
|---|---|---|---|---|
| 82.80 | 3.56 | 21.02 | 0.54 | 20.44 |
| 135.34 | 37.50 | 9.55 | 14.02 | 10.70 |
| 193.09 | 51.31 | 3.07 | 12.47 | 0.80 |

Numerical Example 4
(FIGS. 4 and 12(A) to 12(C))

| | | | |
|---|---|---|---|
| R1 = 52.29 | D1 = 1.8 | N1 = 1.80518 | ν1 = 25.4 |
| R2 = 37.34 | D2 = 0.45 | | |
| R3 = 39.64 | D3 = 5.0 | N2 = 1.65160 | ν2 = 58.5 |
| R4 = −4800.15 | D4 = Variable | | |
| R5 = −54.84 | D5 = 1.2 | N3 = 1.80100 | ν3 = 35.0 |
| R6 = 23.50 | D6 = 1.0 | | |
| R7 = 25.39 | D7 = 3.0 | N4 = 1.84666 | ν4 = 23.9 |
| R8 = 539.21 | D8 = Variable | | |
| R9 = −125.69 | D9 = 1.2 | N5 = 1.84666 | ν5 = 23.9 |
| R10 = 81.08 | D10 = 4.5 | N6 = 1.51118 | ν6 = 51.0 |
| R11 = −27.80 | D11 = Variable | | |
| R12 = 35.20 | D12 = 3.2 | N7 = 1.54814 | ν7 = 45.8 |
| R13 = −85.53 | D13 = 1.4 | | |
| R14 = −30.47 | D14 = 1.2 | N8 = 1.84666 | ν8 = 23.9 |
| R15 = −51.49 | D15 = 0.15 | | |
| R16 = −85.72 | D16 = 2.5 | N9 = 1.51118 | ν9 = 51.0 |
| R17 = −35.59 | D17 = Variable | | |
| R18 = −95.81 | D18 = 2.5 | N10 = 1.80518 | ν10 = 25.4 |
| R19 = −26.29 | D19 = 1.2 | N11 = 1.77250 | ν11 = 49.6 |
| R20 = 37.15 | | | |

Separations during Zooming

| Focal Length | D4 | D8 | D11 | D17 |
|---|---|---|---|---|
| 82.80 | 1.59 | 22.35 | 0.45 | 18.93 |
| 135.82 | 27.45 | 11.48 | 11.32 | 10.37 |
| 192.98 | 42.00 | 4.73 | 18.07 | 1.28 |

Numerical Example 5
(FIGS. 5 and 13(A) to 13(C))

| | | | |
|---|---|---|---|
| R1 = 87.20 | D1 = 7.0 | N1 = 1.80518 | ν1 = 70.2 |
| R2 = −514.49 | D2 = 0.2 | | |
| R3 = 95.55 | D3 = 6.0 | N2 = 1.48749 | ν2 = 70.2 |
| R4 = −259.79 | D4 = 2.0 | N3 = 1.80518 | ν3 = 25.4 |
| R5 = 521.41 | D5 = Variable | | |
| R6 = −56.22 | D6 = 1.6 | N4 = 1.77250 | ν4 = 49.6 |
| R7 = 30.41 | D7 = 2.83 | | |
| R8 = 37.12 | D8 = 4.5 | N5 = 1.65896 | ν5 = 32.2 |
| R9 = −134.48 | D9 = Variable | | |
| R10 = −679.31 | D10 = 1.5 | N6 = 1.84666 | ν6 = 23.9 |
| R11 = 82.83 | D11 = 2.6 | | |
| R12 = 81.94 | D12 = 5.6 | N7 = 1.53215 | ν7 = 43.7 |
| R13 = −35.32 | D13 = Variable | | |
| R14 = 45.93 | D14 = 6.0 | N8 = 1.51263 | ν8 = 85.4 |
| R15 = −30.97 | D15 = 1.4 | N9 = 1.83400 | ν9 = 37.2 |
| R16 = −67.20 | D16 = Variable | | |
| R17 = −154.25 | D17 = 1.2 | N10 = 1.88300 | ν10 = 40.8 |
| R18 = 38.68 | D18 = 1.7 | | |
| R19 = −692.12 | D19 = 3.0 | N11 = 1.76182 | ν11 = 26.5 |
| R20 = −23.73 | D20 = 1.1 | N12 = 1.77250 | ν12 = 49.6 |
| R21 = 800.00 | | | |

Separations during Zooming

| Focal Length | D5 | D9 | D13 | D16 |
|---|---|---|---|---|
| 102.00 | 4.31 | 23.68 | 2.65 | 25.98 |
| 163.98 | 28.81 | 12.36 | 13.97 | 17.38 |
| 292.83 | 54.31 | 5.35 | 20.98 | 1.18 |

Numerical Example 6
(FIGS. 6 and 14(A) to 14(C))

| | | | |
|---|---|---|---|
| R1 = 81.21 | D1 = 2.70 | N1 = 1.80518 | ν1 = 25.4 |
| R2 = 54.67 | D2 = 8.50 | N2 = 1.51633 | ν2 = 64.1 |
| R3 = −512.46 | D3 = 0.20 | | |
| R4 = 83.00 | D4 = 3.80 | N3 = 1.48749 | ν3 = 70.2 |
| R5 = 205.00 | D5 = Variable | | |
| R6 = −56.34 | D6 = 1.30 | N4 = 1.80400 | ν4 = 46.6 |
| R7 = 32.37 | D7 = 2.90 | | |
| R8 = 41.26 | D8 = 3.60 | N5 = 1.72825 | ν5 = 28.5 |
| R9 = −159.98 | D9 = Variable | | |
| R10 = −1407.79 | D10 = 1.60 | N6 = 1.84666 | ν6 = 23.9 |
| R11 = 78.12 | D11 = 2.63 | | |
| R12 = 85.28 | D12 = 5.50 | N7 = 1.54739 | ν7 = 53.5 |
| R13 = −34.65 | D13 = Variable | | |
| R14 = 46.40 | D14 = 6.20 | N8 = 1.48749 | ν8 = 70.2 |
| R15 = −34.56 | D15 = 1.40 | N9 = 1.83400 | ν9 = 37.2 |
| R16 = −77.43 | D16 = Variable | | |
| R17 = −2701.89 | D17 = 1.00 | N10 = 1.83481 | ν10 = 42.7 |
| R18 = 32.85 | D18 = 1.15 | | |
| R19 = −269.56 | D19 = 2.50 | N11 = 1.76182 | ν11 = 26.5 |
| R20 = −24.14 | D20 = 1.00 | N12 = 1.80400 | ν12 = 46.6 |
| R21 = −800.00 | | | |

Separations during Zooming

| Focal Length | D5 | D9 | D13 | D16 |
|---|---|---|---|---|
| 103.00 | 3.00 | 24.08 | 0.59 | 28.86 |
| 162.29 | 27.50 | 14.26 | 10.42 | 19.70 |
| 290.28 | 53.00 | 3.62 | 21.06 | 1.19 |

Numerical Example 7
(FIGS. 7 and 15(A) to 15(C))

| | | | |
|---|---|---|---|
| R1 = 53.19 | D1 = 1.8 | N1 = 1.80518 | ν1 = 25.4 |
| R2 = 38.99 | D2 = 0.43 | | |
| R3 = 43.24 | D3 = 5.3 | N2 = 1.60311 | ν2 = 60.7 |
| R4 = −336.73 | D4 = Variable | | |
| R5 = −47.51 | D5 = 1.1 | N3 = 1.80610 | ν3 = 40.9 |
| R6 = 28.75 | D6 = 3.0 | N4 = 1.80518 | ν4 = 25.4 |
| R7 = 1309.64 | D7 = Variable | | |
| R8 = −116.99 | D8 = 1.1 | N5 = 1.84666 | ν5 = 23.9 |
| R9 = 91.00 | D9 = 4.5 | N6 = 1.60311 | ν6 = 60.7 |
| R10 = −29.97 | D10 = Variable | | |
| R11 = 31.19 | D11 = 5.8 | N7 = 1.53172 | ν7 = 48.9 |
| R12 = −32.04 | D12 = 1.0 | N8 = 1.83400 | ν8 = 37.2 |
| R13 = −105.71 | D13 = Variable | | |
| R14 = −121.38 | D14 = 2.8 | N9 = 1.80518 | ν9 = 25.4 |
| R15 = −28.71 | D15 = 1.1 | | |
| R16 = −26.73 | D16 = 1.2 | N10 = 1.77250 | ν10 = 49.6 |
| R17 = 40.08 | | | |

Separations during Zooming

| Focal Length | D4 | D7 | D10 | D13 |
|---|---|---|---|---|
| 83.20 | 1.99 | 25.94 | 0.57 | 20.10 |
| 135.05 | 26.99 | 16.90 | 9.60 | 11.07 |
| 192.94 | 40.32 | 6.84 | 19.67 | 1.00 |

Numerical Example 8
(FIGS. 8 and 16(A) to 16(C))

| | | | |
|---|---|---|---|
| R1 = 55.55 | D1 = 1.8 | N1 = 1.80518 | ν1 = 25.4 |
| R2 = 39.55 | D2 = 0.44 | | |
| R3 = 43.11 | D3 = 5.0 | N2 = 1.65160 | ν2 = 58.8 |
| R4 = −885.45 | D4 = Variable | | |
| R5 = −58.48 | D5 = 1.0 | N3 = 1.80100 | ν3 = 35.0 |
| R6 = 23.07 | D6 = 1.0 | | |
| R7 = 25.36 | D7 = 2.9 | N4 = 1.84666 | ν4 = 23.9 |
| R8 = 429.18 | D8 = Variable | | |
| R9 = −132.23 | D9 = 1.0 | N5 = 1.84666 | ν5 = 23.9 |
| R10 = 74.50 | D10 = 4.3 | N6 = 1.51118 | ν6 = 51.0 |
| R11 = −26.97 | D11 = Variable | | |
| R12 = 36.82 | D12 = 3.3 | N7 = 1.54814 | ν7 = 45.8 |
| R13 = −107.90 | D13 = 1.4 | | |
| R14 = −30.82 | D14 = 1.0 | N8 = 1.84666 | ν8 = 23.9 |
| R15 = −47.37 | D15 = 0.15 | | |
| R16 = −66.99 | D16 = 2.5 | N9 = 1.51118 | ν9 = 51.0 |
| R17 = −35.35 | D17 = Variable | | |
| R18 = −129.57 | D18 = 2.4 | N10 = 1.80518 | ν10 = 25.4 |
| R19 = −32.59 | D19 = 1.0 | | |
| R20 = −30.77 | D20 = 1.0 | N11 = 1.77250 | ν11 = 49.6 |
| R21 = 38.87 | | | |

Separations during Zooming

| Focal Length | D4 | D8 | D11 | D17 |
|---|---|---|---|---|
| 82.80 | 1.73 | 23.04 | 0.44 | 19.95 |
| 135.18 | 28.90 | 12.99 | 9.72 | 10.67 |
| 193.03 | 43.16 | 4.70 | 19.59 | 0.80 |

TABLE 1

| Condition No. | Factor | Numerical Example | | | |
|---|---|---|---|---|---|
| | | 1 | 2 | 3 | 4 |
| (1) | Δe34/DW | 0.087 | 0.101 | 0.069 | 0.103 |
| (2) | f5/f12W | 0.172 | 0.230 | 0.281 | 0.151 |
| (3) | f12W/fW | −2.510 | −1.567 | −1.779 | −2.838 |
| (4) | f3/f4 | 1.431 | 0.835 | 1.347 | 2.319 |
| | | 5 | 6 | 7 | 8 |
| (1) | Δe34/DW | 0.061 | 0.071 | 0.106 | 0.109 |
| (2) | f5/f12W | 0.121 | 0.149 | 0.241 | 0.189 |
| (3) | f12W/fW | −2.593 | −2.216 | −1.924 | −2.489 |
| (4) | f3/f4 | 1.189 | 0.957 | 1.435 | 1.979 |

As has been described above, according to the invention, a compact zoom lens having a range of about 2.5 with shortening of the total length of the entire lens system while still permitting good stability of aberration correction throughout the entire range of magnification can be achieved by using five lens groups of refractive powers of predetermined sign and the conditions for the movements of the zooming lens groups and the rules of lens designs set forth before.

What is claimed is:

1. A compact zoom lens comprising, from front to rear, a first lens group of positive refractive power, a second lens group of negative refractive power, a third lens group of positive refractive power, a fourth lens group of positive refractive power and a fifth lens group of negative refractive power, wherein at least one of the first, second, third, fourth and fifth lens groups are movable in such a manner that when zooming from a wide-angle end to a telephoto end, said first lens group is moved toward the object side, while simultaneously monotonously increasing an air separation between said first lens group and said second lens group, monotonously decreasing an air separation between said second lens group and said third lens group and monotonously decreasing an air separation between said fourth lens group and said fifth lens group, and said zoom lens satisfying the following conditions:

$$0.05 \, fT/fW < \Delta e34/DW < 0.15 \, fT/FW$$
$$0.05 < f5/f12W < 0.6$$

where fW and fT are focal lengths of the entire lens system at the wide-angle end and the telephoto end respectively, f5 is a focal length of said fifth lens group, f12W is an overall focal length of said first lens group and said second lens group at the wide-angle end, $\Delta e34$ is a changed amount of the interval of principal points of said third lens group and said fourth lens group at the telephoto end from that at the wide-angle end, and DW is the length of the entire lens system from the first lens surface to the last lens surface at the wide-angle end.

2. A compact zoom lens according to claim 1, further, satisfying the following condition:

$$-3.5 < f12W/fW < -1.3.$$

3. A compact zoom lens according to claim 1 or 2, further satisfying the following condition:

$$0.35 < f3/f4 < 2.5$$

where f3 and f4 are focal lengths of said third lens group and said fourth lens group respectively.

4. A compact zoom lens according to claim 1, wherein zooming from the wide-angle end to the telephoto end is performed by moving said first, third and fifth lens groups toward the object side according to respective different loci, while keeping said second and fourth lens groups stationary.

5. A compact zoom lens according to claim 4, further satisfying the following conditions:

$$0.05\, fT/fW < \Delta e34/DW < 0.11\, fT/fW$$

$$0.05 < f5/f12W < 0.17$$

6. A compact zoom lens according to claim 5, satisfying the following conditions:

$$-3.5 < f12W/fW < -2$$

$$0.85 < f3/f4 < 2.5$$

where f3 and f4 are focal lengths of said third lens group and said fourth lens group respectively.

7. A compact zoom lens according to claim 1, wherein zooming from the wide-angle end to the telephoto end is performed by moving said first lens group toward the object side and moving said third and fifth lens groups toward the object side in unified relation, while keeping at least said fourth lens group stationary.

8. A compact zoom lens according to claim 7, further satisfying the following conditions:

$$0.09\, fT/fW < \Delta e34/DW < 0.15\, fT/fW$$
$$0.16 < f5/f12W < 0.28$$

9. A compact zoom lens according to claim 8, further satisfying the following conditions:

$$-2.7 < f12W/fW < -1.7$$

$$1.2 < f3/f4 < 2.2$$

where f3 and f4 are focal lengths of said third lens group and said fourth lens group respectively.

* * * * *

UNITED STATES PATENT AND TRADEMARK OFFICE
CERTIFICATE OF CORRECTION

PATENT NO. : 5,042,927
DATED : August 27, 1991
INVENTOR(S) : HIDEKI OGAWA, ET AL.

Page 1 of 3

It is certified that error appears in the above-identified patent and that said Letters Patent is hereby corrected as shown below:

IN THE ABSTRACT:

Column [57]:

Line 10, "monotonously" should read --linearly--.

Column [57]:

Line 11, "monotonously" should read --linearly--.

Column [57]

Line 21, "principle" should read --principal--.

Column 1:

Line 27, "60-1755020" should read --60-175020--.

Line 35, "in" should read --of--.

Column 2:

Line 27, "monoto-" should read --linearly--.

Line 28, "nously" should be deleted.

Line 29, "monotonously" should read --linearly--.

Line 31, "monotonously" should read --linearly--.

Line 63, "comprises" should read --comprise--.

UNITED STATES PATENT AND TRADEMARK OFFICE
CERTIFICATE OF CORRECTION

PATENT NO. : 5,042,927
DATED : August 27, 1991
INVENTOR(S) : HIDEKI OGAWA, ET AL.

Page 2 of 3

It is certified that error appears in the above-identified patent and that said Letters Patent is hereby corrected as shown below:

Column 3:
    Line 10, "shares to" should read --shares in--.
    Line 16, "monotonously" should read --linearly--.
    Line 17, "monoto-" should read --linearly--.
    Line 18, "nously" should be deleted.
    Line 19, "monotonously" should read --linearly--

Column 5:
    Line 17, "much" should be deleted.
    Line 52, "much" should be deleted.

Column 6:
    Line 50, "v," should read --$\upsilon$,--.

UNITED STATES PATENT AND TRADEMARK OFFICE
CERTIFICATE OF CORRECTION

PATENT NO. :  5,042,927
DATED :  August 27, 1991
INVENTOR(S) :  HIDEKI OGAWA, ET AL.

It is certified that error appears in the above-identified patent and that said Letters Patent is hereby corrected as shown below:

Column 10:
    Line 58, "monotonously" should read --linearly--.
    Line 59, "monoto-" should read --linearly--.
    Line 60, "nously" should be deleted.
    Line 61, "monotonously" should read --linearly--.

Column 11:
Line 12, "further," should read --further--.

Signed and Sealed this

Twenty-fifth Day of May, 1993

Attest:

MICHAEL K. KIRK

Attesting Officer     Acting Commissioner of Patents and Trademarks